(12) United States Patent
Matsumoto et al.

(10) Patent No.: US 9,644,058 B2
(45) Date of Patent: May 9, 2017

(54) PROCESS FOR PRODUCING POLYACRYLIC ACID (SALT)-BASED WATER ABSORBENT RESIN

(71) Applicant: Nippon Shokubai Co., Ltd., Hyogo (JP)

(72) Inventors: Makoto Matsumoto, Hyogo (JP); Seiji Kato, Hyogo (JP); Shinichi Fujino, Hyogo (JP); Noboru Nabara, Hyogo (JP); Ryuichi Otani, Hyogo (JP); Yasuhiro Kawaguchi, Hyogo (JP); Narimasa Okugawa, Hyogo (JP); Kentaro Ichikawa, Hyogo (JP); Makoto Eto, Hyogo (JP)

(73) Assignee: Nippon Shokubai Co. Ltd., Osaka (JP)

( * ) Notice: Subject to any disclaimer, the term of this patent is extended or adjusted under 35 U.S.C. 154(b) by 0 days.

(21) Appl. No.: 14/418,796

(22) PCT Filed: Aug. 1, 2013

(86) PCT No.: PCT/JP2013/070916
§ 371 (c)(1),
(2) Date: Jan. 30, 2015

(87) PCT Pub. No.: WO2014/021432
PCT Pub. Date: Feb. 6, 2014

(65) Prior Publication Data
US 2015/0240013 A1    Aug. 27, 2015

(30) Foreign Application Priority Data

Aug. 1, 2012 (JP) ................................. 2012-171042
Aug. 2, 2012 (JP) ................................. 2012-171554
Aug. 2, 2012 (JP) ................................. 2012-171555

(51) Int. Cl.
*C08F 222/02* (2006.01)
*C08J 3/12* (2006.01)
(Continued)

(52) U.S. Cl.
CPC .............. *C08F 222/02* (2013.01); *B07B 1/46* (2013.01); *B07B 1/54* (2013.01); *C08F 220/06* (2013.01);
(Continued)

(58) Field of Classification Search
None
See application file for complete search history.

(56) References Cited

U.S. PATENT DOCUMENTS 4,152,253 A    5/1979  Summers
5,562,646 A   10/1996  Goldman et al.
(Continued)

FOREIGN PATENT DOCUMENTS

GB    1193260       5/1970
JP    63025181 U    2/1988
(Continued)

OTHER PUBLICATIONS

Translation of p. 1 of JP 63-256169A, Oct. 24, 1988.*
(Continued)

*Primary Examiner* — Vu A Nguyen
(74) *Attorney, Agent, or Firm* — Cesari and McKenna LLP

(57) ABSTRACT

Provided is a method for producing a polyacrylic acid (salt)-based water absorbent resin in which the physical properties (especially liquid permeability) are improved and maintained even in large scale production. The method for producing a polyacrylic acid (salt)-based water absorbent resin, which sequentially includes a polymerization step, in which a monomer aqueous solution having acrylic acid (salt)
(Continued)

as a main component is polymerized, a drying step, in which a water-containing gel-like crosslinked polymer obtained in the polymerization step is dried, and a classification step, in which a polymer obtained in the drying step is classified, wherein a rocking-type sieve classification apparatus is used in the classification step, and the rocking-type sieve classification apparatus has a sieve net having a trajectory and a rotation speed in the following ranges; radial gradient R: from 5 to 40 mm, tangential gradient T: from 0.1 to 25 mm, eccentric gradient E: from 40 to 80 mm, and rotation speed F: from 60 to 600 rpm.

26 Claims, 3 Drawing Sheets

(51) Int. Cl.
| | |
|---|---|
| C08F 220/06 | (2006.01) |
| C08J 3/24 | (2006.01) |
| B07B 1/46 | (2006.01) |
| B07B 1/54 | (2006.01) |
| C08F 222/10 | (2006.01) |
| B07B 1/28 | (2006.01) |
| B07B 1/50 | (2006.01) |
| B07B 1/56 | (2006.01) |

(52) U.S. Cl.
CPC ......... *C08F 222/1006* (2013.01); *C08J 3/245* (2013.01); *B07B 1/28* (2013.01); *B07B 1/50* (2013.01); *B07B 1/56* (2013.01); *B07B 2201/04* (2013.01); *C08J 2333/02* (2013.01)

(56) References Cited

U.S. PATENT DOCUMENTS

| | | | |
|---|---|---|---|
| 6,164,455 A | 12/2000 | Kakita et al. | |
| 6,291,636 B1 | 9/2001 | Miyake et al. | |
| 6,414,214 B1 | 7/2002 | Engelhardt et al. | |
| 6,562,879 B1 | 5/2003 | Hatsuda et al. | |
| 6,576,713 B2 | 6/2003 | Ishizaki et al. | |
| 6,641,064 B1 | 11/2003 | Dentler et al. | |
| 6,817,557 B2 | 11/2004 | Kakita et al. | |
| 6,849,665 B2 | 2/2005 | Frenz et al. | |
| 7,169,843 B2 | 1/2007 | Smith et al. | |
| 7,173,086 B2 | 2/2007 | Smith et al. | |
| 2002/0128618 A1 | 9/2002 | Frenz et al. | |
| 2005/0245684 A1 | 11/2005 | Daniel et al. | |
| 2005/0256469 A1 | 11/2005 | Qin et al. | |
| 2007/0293617 A1 | 12/2007 | Riegel et al. | |
| 2008/0114129 A1 | 5/2008 | Herfert et al. | |
| 2008/0125533 A1 | 5/2008 | Riegel et al. | |
| 2008/0187755 A1 | 8/2008 | Herfert et al. | |
| 2008/0202987 A1 | 8/2008 | Weismantel et al. | |
| 2008/0221237 A1 | 9/2008 | Herfert et al. | |
| 2008/0287631 A1 | 11/2008 | Nitschke | |
| 2009/0194462 A1 | 8/2009 | Stueven et al. | |
| 2009/0204087 A1 | 8/2009 | Herfert et al. | |
| 2009/0261023 A1* | 10/2009 | Stueven ................. B07B 1/00 209/235 |
| 2010/0010461 A1 | 1/2010 | Herfert et al. | |
| 2010/0041550 A1 | 2/2010 | Riegel et al. | |
| 2010/0063469 A1 | 3/2010 | Herfert | |
| 2010/0101982 A1 | 4/2010 | Konishi et al. | |
| 2011/0042612 A1 | 2/2011 | Riegel et al. | |
| 2011/0166300 A1 | 7/2011 | Dairoku et al. | |
| 2012/0001000 A1 | 1/2012 | Funk et al. | |
| 2012/0220733 A1 | 8/2012 | Machida et al. | |
| 2012/0220745 A1* | 8/2012 | Machida ................. C08J 3/122 526/317.1 |
| 2013/0066019 A1* | 3/2013 | Okuda ................. C08F 220/06 525/329.7 |
| 2013/0098809 A1 | 4/2013 | Stueven et al. | |
| 2013/0123435 A1 | 5/2013 | Okuda et al. | |

FOREIGN PATENT DOCUMENTS

| | | |
|---|---|---|
| JP | 63086885 U | 6/1988 |
| JP | 63256169 A | 10/1988 |
| JP | 10028935 A | 2/1998 |
| JP | 2003213008 A | 7/2003 |
| JP | 2009154108 A | 7/2009 |
| JP | 2013076073 A | 4/2013 |

OTHER PUBLICATIONS

Page 4 of JP 63-256169A, Oct. 24, 1988.*
International Preliminary Report on Patentability issued for International Application No. PCT/JP2013/070916, Feb. 12, 2015.

* cited by examiner

PROCESS FOR PRODUCING POLYACRYLIC ACID (SALT)-BASED WATER ABSORBENT RESIN

CROSS REFERENCE TO RELATED APPLICATIONS

This application is the National Stage of International Application No. PCT/JP2013/070916, filed on Aug. 1, 2013, which claims the benefit of Japanese Application No. 2012-171042, filed on Aug. 1, 2012; Japanese Application No. 2012-171554, filed on Aug. 2, 2012; and Japanese Application No. 2012-171555, filed on Aug. 2, 2012. The contents of all four applications are hereby incorporated by reference in their entirety.

TECHNICAL FIELD

The present invention relates to a method for producing a polyacrylic acid (salt)-based water absorbent resin. More specifically, the present invention relates to a method for producing a polyacrylic acid (salt)-based water absorbent resin that contains a low fine powder and has high liquid permeability, which method sequentially includes a step of polymerizing a monomer aqueous solution, a drying step after the polymerization, and a classification step.

BACKGROUND ART

Water absorbent resins (SAPs/Super Absorbent Polymers) are water-swellable, water-insoluble polymer gelling agents, and are frequently used mainly for disposable uses as hygiene products such as disposable diapers and sanitary napkins, water retention agents for agriculture and horticulture, or industrial water stopping materials, or the like. Furthermore, various monomers and hydrophilic polymers have been suggested as raw materials for water absorbent resins, and polyacrylic acid (salt)-based water absorbent resins using acrylic acid and/or a salt thereof as a monomer are most frequently used in industries for their high water absorbent abilities.

Such water absorbent resins are produced through a polymerization step, a drying step, (where necessary, a step for removing an undried product), a pulverizing step, a classification step, a surface cross-linking step and the like (Patent Literatures 1 to 5). In accordance with the improvement of performances of disposable diapers as main intended use, many functions are required also for water absorbent resins. Specifically, not only a mere high water absorption capacity, but also many physical properties such as gel strength, water soluble component, water absorbent speed, water absorption capacity under load, liquid permeability, particle size distribution, urine resistance, antibacterial property, impact resistance, powder body fluidity, odor eliminating property, anticoloring property, and low powder dust are required for water absorbent resins. Therefore, many technologies for improvement such as a surface-cross-linking technology, additives, and modification of a production process are suggested by Patent Literatures 1 to 32 and others.

Among the above-mentioned physical properties, liquid permeability has been especially considered as a more important factor in accordance with the increase of the use amounts of water absorbent resins in disposable diapers (for example, 50% by weight or more) in recent years, and many methods for improving liquid permeability under loading and liquid permeability without loading such as SFC (Saline Flow Conductivity/Patent Literature 6) and GBP (Gel Bed Permeability/Patent Literatures 7 to 9) and improved technologies have been suggested.

Furthermore, many suggestions in which a plurality of parameters including liquid permeability are combined have been made, and for example, a technology for defining an impact resistance (FI) (Patent Literature 10), a technology for defining a water absorbent speed (FSR/Vortex) and the like (Patent Literature 11), a technology for defining a product of a liquid diffusion performance (SFC) and a core absorption amount after 60 minutes (DA60) (Patent Literature 12) are known.

Furthermore, as methods for improving liquid permeability such as SFC or GBP, a technology of adding gypsum before polymerization or during polymerization (Patent Literature 13), a technology of adding a spacer (Patent Literature 14), a technology of using 5 to 17 mol/kg of nitrogen-containing polymer having nitrogen atoms that can be protonized (Patent Literature 15), a technology of using a polyamine and a polyvalent metal ion or a polyvalent anion (Patent Literature 16), a technology of coating a water absorbent resin having a pH of lower than 6 with a polyamine (Patent Literature 17), and a technology of using a polyammonium carbonate (Patent Literature 18) are known. Furthermore, a technology of using a polyamine with a soluble component of 3% by weight or more, and technologies of defining a wicking index (WI) or a gel strength (Patent Literatures 19 to 21) are known. In addition, a technology of using a polyvalent metal salt while controlling methoxyphenol, which is a polymerization inhibitor during polymerization, so as to improve coloring and liquid permeability (Patent Literatures 22 and 23) is also known.

In addition, as methods for improving liquid permeability in a pulverizing step and a classification step, a technology of controlling a bulk specific gravity to be high by polishing particles (Patent Literature 24), a technology of assembling two or more classified polymers to give one classified polymer (Patent Literature 25), and a technology of removal of electricity (Patent Literature 26) are also known.

Especially, as methods for sieve classification of a water absorbent resin, a technology of heating or insulation (Patent Literature 27), a technology of reducing a pressure (Patent Literature 28), a technology of using a guide apparatus (Patent Literature 29), a technology of increasing an opening of a sieve for separating coarse particles after post-cross-linking (secondary cross-linking) (Patent Literature 30), a technology of combining a plurality of different classification steps (Patent Literature 31), and a technology of using a ball cleaning apparatus (Patent Literature 32) are known.

CITATION LIST

Patent Literatures

Patent Literature 1: U.S. Pat. No. 6,576,713
Patent Literature 2: U.S. Pat. No. 6,817,557
Patent Literature 3: U.S. Pat. No. 6,291,636
Patent Literature 4: U.S. Pat. No. 6,641,064
Patent Literature 5: US 2008/0287631 A
Patent Literature 6: U.S. Pat. No. 5,562,646
Patent Literature 7: US 2005/0256469 A
Patent Literature 8: U.S. Pat. No. 7,169,843
Patent Literature 9: U.S. Pat. No. 7,173,086
Patent Literature 10: U.S. Pat. No. 6,414,214
Patent Literature 11: U.S. Pat. No. 6,849,665
Patent Literature 12: US 2008/125533 A
Patent Literature 13: US 2007/293617 A Patent Literature 14: US 2002/0128618 A
Patent Literature 15: US 2005/0245684 A
Patent Literature 16: WO 2006/082197 A
Patent Literature 17: WO 2006/082188 A
Patent Literature 18: WO 2006/082189 A
Patent Literature 19: WO 2008/025652 A
Patent Literature 20: WO 2008/025656 A
Patent Literature 21: WO 2008/025655 A
Patent Literature 22: WO 2008/092843 A
Patent Literature 23: WO 2008/092842 A
Patent Literature 24: U.S. Pat. No. 6,562,879
Patent Literature 25: WO 2008/037675 A
Patent Literature 26: WO 2010/032694 A
Patent Literature 27: U.S. Pat. No. 6,164,455
Patent Literature 28: WO 2006/074816 A
Patent Literature 29: WO 2008/037672 A
Patent Literature 30: WO 2008/037673 A
Patent Literature 31: WO 2008/123477 A
Patent Literature 32: WO 2010/094639 A

SUMMARY OF INVENTION

Technical Problem

As mentioned above, many surface crosslinking agent technologies, additive technologies, modification of conditions in a production process or the like have been suggested until now for the purpose of improving the physical properties of water absorbent resins. Specifically, liquid permeability has been positioned as a very important fundamental physical property in accordance with thinning of disposable diapers, and many improved technologies have been suggested (Patent Literatures 6 to 26).

However, modification or addition of raw materials for water absorbent resins such as surface crosslinking agents and additives (for example, polyamine polymers, inorganic microparticles, thermoplastic polymers and the like) not only decreased the safeness of the raw materials and increased the costs, but also sometimes decreased physical properties other than liquid permeability. Furthermore, since the amount of equipment investment for adding new agents became high, and industrially complex operations were required, the producibility and physical properties were rather decreased in some cases. In addition, although the above-mentioned means showed a certain level of effect at a small scale such as a laboratory, they did not show a sufficient effect at a large scale of an actual plant in some cases (for example, at a production amount of 1 (t/hr) or more).

Furthermore, from the viewpoints of classification efficiency and producibility, a method of increasing a retention amount on a sieve net and a method of installing a guide apparatus have been adopted until now in sieve classification, but many troubles of breaking of sieve nets were seen. In addition, a method of adding a modifier for the purpose of improving the fluidity of a water absorbent resin has also been adopted, but this method rather lead to the decrease in classification efficiency, and the physical properties of the water absorbent resin consequently decreased in some cases.

Therefore, in order to solve the above-mentioned problems, the present invention aims at providing a method for producing a polyacrylic acid (salt)-based water absorbent resin whose physical properties (especially liquid permeability) are improved and maintained even in large scale production.

Means for Solving Problem

In order to solve the above-mentioned problem, the present inventors did intensive studies on a method of classification of a water absorbent resin in a classification step, and consequently found that a classification efficiency was improved even at a large scale by setting the trajectory of a sieve net to be within a predetermined range, and decreasing of a micropowder and improvement of the liquid permeability of the obtained water absorbent resin were consequently achieved, whereby the present invention was completed.

Specifically, the method for producing a polyacrylic acid (salt)-based water absorbent resin according to the present invention, which solves the above-mentioned problem, is characterized by sequentially including a polymerization step, in which a monomer aqueous solution having acrylic acid (salt) as a main component is polymerized, a drying step, in which a water-containing gel-like crosslinked polymer obtained in the polymerization step is dried, and a classification step, in which a polymer obtained in the drying step is classified, wherein a rocking-type sieve classification apparatus is used in the classification step, and the rocking-type sieve classification apparatus has a sieve net having a trajectory and a rotation speed in the following ranges; radial gradient R: 5 to 40 mm, tangential gradient T: 0.1 to 25 mm, eccentric gradient E: 40 to 80 mm, rotation speed F: 60 to 600 rpm.

Furthermore, another method for producing a water absorbent resin (a polyacrylic acid (salt)-based water absorbent resin) according to the present invention, which solves the above-mentioned problem, is characterized by including: a polymerization step, in which an acrylic acid (salt) aqueous solution is polymerized to give a water-containing gel-like crosslinked polymer, a drying step, in which the water-containing gel-like crosslinked polymer is dried to give a water absorbent resin powder, a classification step, in which the water absorbent resin powder is classified, and a surface cross-linking step, in which the surface of the water absorbent resin powder is crosslinked. Furthermore, the method is characterized by that a rocking-type sieve classification apparatus is used in the classification step that is conducted before and/or after the surface cross-linking step, and the rocking-type sieve classification apparatus uses a sieve net having a plurality of support materials.

Advantageous Effects of the Invention

According to the present invention, in a method for producing a polyacrylic acid (salt)-based water absorbent resin including a polymerization step, a drying step and a classification step, the physical properties (for example, liquid permeability) and producibility of the obtained water absorbent resin can be improved, and the performances of the water absorbent resin can be stabilized.

DESCRIPTION OF EMBODIMENTS

Figure 1:
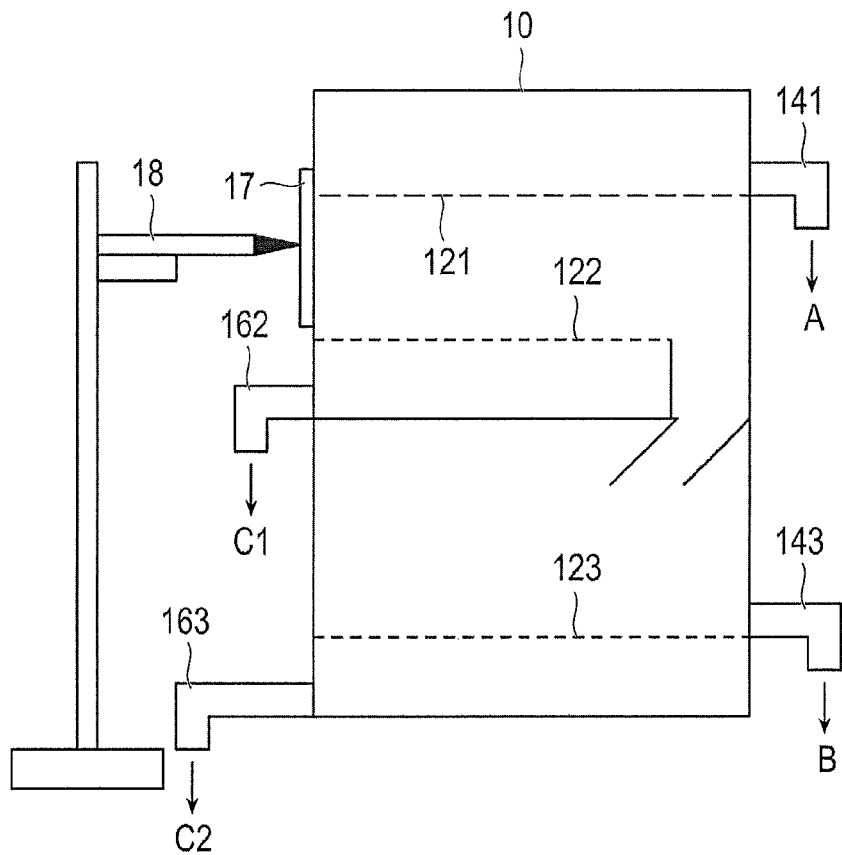
FIG. 1 is a schematic view of a measurement apparatus for measuring the trajectory of the sieve in the present invention.

The method for producing a polyacrylic acid (salt)-based water absorbent resin according to the present invention will be explained below in detail, but the scope of the present invention is not bound by these explanations, and can be suitably modified and conducted within a scope in which the purport of the present invention is not deteriorated for methods other than those exemplified below.

[1] Definition of Terms (a) "Water Absorbent Resin"

In this specification, "water absorbent resin" means a water-swellable and water-insoluble "polymer gelling agent (gelling agent)", which has the following physical properties. Specifically, it is a water absorbent resin having water swellability CRC (a water absorption capacity without load) of 5 (g/g) or more. The CRC is preferably from 10 to 100 (g/g), more preferably from 20 to 80 (g/g). Furthermore, water insolubility Ext (water soluble component) of from 0 to 50% by weight is required. Ext is preferably from 0 to 30% by weight, more preferably from 0 to 20% by weight, still more preferably from 0 to 10% by weight.

The "water absorbent resin" is not limited to an embodiment in which the whole amount (100% by weight) is a polymer, and may contain additives and the like (mentioned below) in a scope in which the above-mentioned performances are maintained. That is to say, a water absorbent resin composition containing a water absorbent resin and additives is also collectively called "water absorbent resin" in the present invention. The content of the water absorbent resin (polyacrylic acid (salt)-based water absorbent resin) in the case when the water absorbent resin is a water absorbent resin composition is preferably from 70 to 99.9% by weight, more preferably from 80 to 99.7% by weight, still more preferably from 90 to 99.5% by weight relative to the entirety of the composition. As the components other than the water absorbent resin, water is preferable from the viewpoints of the water absorbent speed and the impact resistance of the powder (particles), and where necessary, the following additives are contained.

(b) "Polyacrylic Acid (Salt)"

In this specification, "polyacrylic acid (salt)" means a polymer that arbitrary contains a graft component and contains, as a main component, acrylic acid (salt) as a repeating unit. Specifically, it means a polymer that contains acrylic acid (salt) as a monomer other than a crosslinking agent essentially by from 50 to 100 mol %, preferably by from 70 to 100 mol %, more preferably by 90 to 100 mol %, still more preferably by substantially 100 mol %. The salt as the polymer essentially contains a water-soluble salt, and contains preferably a monovalent salt, more preferably an alkali metal salt or an ammonium salt, still more preferably an alkali metal salt, particularly preferably a sodium salt.

(c) "EDANA" and "ERT"

"EDANA" is an abbreviation for European Disposables and Nonwovens Associations, and "ERT" is an abbreviation for a method for measuring a water absorbent resin, which is an European standard (almost international standard) (ERT/EDANA Recommended Test Method). In this specification, unless otherwise specified, the physical properties of a water absorbent resin are measured based on the ERT original (a known document: revised in 2002).

(c-1) "CRC" (ERT441.2-02)

"CRC" is an abbreviation for Centrifuge Retention Capacity, and means a water absorption capacity without load (hereinafter referred to as "water absorption capacity"). Specifically, it is a water absorption capacity (unit; (g/g)) after freely swelling 0.200 g of a water absorbent resin in a nonwoven fabric with 0.9% by weight of brine for 30 minutes, and dehydrating it by a centrifuge (250 G).

(c-2) "AAP" (ERT442.2-02)

"AAP" is an abbreviation for Absorption Against Pressure, and means a water absorption capacity under load. Specifically, it is a water absorption capacity (unit; (g/g)) after swelling 0.900 g of a water absorbent resin in 0.9% by weight brine for 1 hour under a load of 2.06 kPa. In the present invention and Examples, the measurements were conducted at 4.83 kPa.

(c-3) "Extractables" (ERT470.2-02)

"Extractables" means the amount of the water-soluble component (soluble component). Specifically, it is a value (unit; % by weight) obtained by adding 1.000 g of a water absorbent resin to 200 ml of 0.9% by weight brine, stirring the mixture for 16 hours, and measuring the amount of the dissolved polymer by pH titration.

(c-4) "PSD" (ERT420.2-02)

PSD" is an abbreviation for Particle Size Distribution, and means a particle size distribution measured by sieve classification. The weight average particle diameter and particle diameter distribution width are measured by similar methods to those in "(1) Average Particle Diameter and Distribution of Particle Diameter" described in European Patent Publication for Opposition No. 0349240, page 7, lines 25 to 43 and WO 2004/069915.

(c-5) Others

"pH" (ERT400.2-02) means the pH of the water absorbent resin.

"Moisture Content" (ERT430.2-2) means the moisture content of the water absorbent resin.

"Flow Rate" (ERT450.2-02) means the flow-down speed of the water absorbent resin.

"Density" (ERT460.2-02) means the bulk specific gravity of the water absorbent resin.

(d) "Liquid Permeability"

The "liquid permeability" of the water absorbent resin refers to the flowability of a liquid that goes through particles of a swelled gel under loading or without loading, and typical measurement methods are SFC (Saline Flow Conductivity) and GBP (Gel Bed Permeability).

"SFC (Saline Flow Conductivity)" refers to the liquid permeability of a 0.69% by weight of sodium chloride aqueous solution against a water absorbent resin under a load of 2.07 kPa, and is measured according to the SFC test method disclosed in U.S. Pat. No. 5,669,894.

"GBP (Gel Bed Permeability)" refers to the liquid permeability of a 0.9% by weight of sodium chloride aqueous solution against a water absorbent resin under loading or free swelling, and is measured according to the GBP test method disclosed in WO 2005/016393.

(e) "Others"

In this specification, "X to Y" that indicates a range means "X or more and Y or less". Furthermore, "t (ton)", which is a unit of weight, means "Metric ton". Furthermore, unless otherwise specified, "ppm" means "weight ppm" or "mass ppm". In addition, "weight" and "mass", "part by weight" and "part by mass", "% by weight" and "% by mass" are handled as synonyms. Furthermore, " . . . acid (salt)" means " . . . acid and/or a salt thereof", "(meth)acrylic" means "acrylic and/or methacrylic", respectively.

[2] Method for Producing Polyacrylic Acid (Salt)-Based Water Absorbent Resin (2-1) Polymerization Step This step is a step of obtaining a water-containing gel-like crosslinked polymer (hereinafter referred to as "hydrogel") by polymerizing an acrylic acid (salt)-based monomer aqueous solution (a monomer aqueous solution containing acrylic acid (salt) as a main component).

(a) Monomer (Excluding Crosslinking Agent)

For the polyacrylic acid (salt)-based water absorbent resin in the present invention, it is preferable to use a monomer containing, as a main component, acrylic acid (salt) in which at least a part of the acrylic acid has been neutralized as a raw material from the viewpoints of the water-absorbability and the residual monomer amount of the water absorbent resin.

The above-mentioned acrylic acid salt is not especially limited, and one or more kinds of monovalent salt (s) selected from alkali metal salts, ammonium salts and amine salts are preferable from the viewpoint of water-absorbability, alkali metal salts are more preferable, one or more kinds acrylic salts selected from sodium salts, lithium salts and potassium salts are still more preferable, and sodium salts are particularly preferable.

The above-mentioned neutralization can be conducted on the monomer before the polymerization and/or the hydrogel after the polymerization, and the neutralization rate is preferably from 10 to 100 mol %, more preferably from 30 to 95 mol %, still more preferably from 50 to 90 mol %, and particularly preferably from 60 to 80 mol %.

The above-mentioned monomer containing acrylic acid (salt) as a main component (including the following crosslinking agent) is generally polymerized in the form of an aqueous solution. The monomer concentration at this time is generally from 10 to 70% by weight, preferably from 15 to 65% by weight, and more preferably 30 to 55% by weight. The polymerization can be conducted also by a slurry liquid (water dispersion liquid) that exceeds a saturation concentration, but a monomer aqueous solution at a saturated concentration or less is preferable from the viewpoint of physical properties.

In order to improve the physical properties of the water absorbent resin of the present invention, additives such as foaming agents such as carbonates, azo compounds and air bubbles and surfactants, and water-soluble resins or water absorbent resins such as starch, polyacrylic acid (salts) and polyethyleneimine may be added as optional components to the acrylic acid (salt)-based monomer aqueous solution, the hydrogel after the polymerization, the dried polymer, the pulverized polymer or the water absorbent resin powder. The above-mentioned additives are added by preferably from 0 to 5% by weight, more preferably from 0 to 1% by weight relative to the monomer. Furthermore, the water-soluble resin or water absorbent resin is added by preferably from 0 to 50% by weight, more preferably from 0 to 20% by weight, still more preferably from 0 to 10% by weight, particularly preferably from 0 to 3% by weight relative to the monomer.

In the present invention, in the case when the acrylic acid (salt) is used as a main component, a hydrophilic or hydrophobic unsaturated monomer can be contained besides the acrylic acid (salt). More specific examples include methacrylic acid, (anhydrous) maleic acid, 2-(meth)acrylamido-2-methylpropanesulfonic acid, (meth)acryloxyalkanesulfonic acids, N-vinyl-2-pyrrolidone, N-vinylacetamide, (meth)acrylamide, N-isopropyl(meth)acrylamide, N,N-dimethyl (meth)acrylamide, 2-hydroxyethyl(meth)acrylate, methoxypolyethylene glycol (meth)acrylate, polyethylene glycol (meth)acrylate, stearyl acrylate and salts thereof, and the like. These unsaturated monomers are used within a range in which the physical properties of the obtained water absorbent resin are not deteriorated, i.e., within a range of preferably from 0 to 50% by weight, more preferably from 0 to 20% by weight relative to the total monomer.

(b) Crosslinking Agent (Internal Crosslinking Agent)

In the present invention, it is preferable to use a crosslinking agent (internal crosslinking agent) from the viewpoint of water absorption property. As the internal crosslinking agent, crosslinking agents that can be polymerized with acrylic acid, crosslinking agents that can react with a carboxyl group, or crosslinking agents having both of these properties can be exemplified. More specific examples include polymerizable crosslinking agents such as compounds having at least two polymerizable double bonds in a molecule such as N,N'-methylenebisacrylamide, (poly)ethylene glycol di(meth)acrylate, (polyoxyethylene)trimethylolpropane tri(meth)acrylate and poly(meth)aryloxyalkanes. Furthermore, as the reactive crosslinking agents, polyglycidyl ethers such as ethylene glycol diglycidyl ether, covalent-bonding crosslinking agents such as polyvalent alcohols such as propanediol, glycerin and sorbitol, ion-bonding crosslinking agents such as polyvalent metal compounds such as aluminum can be exemplified. Among these, crosslinking agents that are polymerizable with acrylic acid are preferable from the viewpoint of water absorption property, and acrylate-type, allyl-type and acrylamide-type polymerizable crosslinking agents are particularly preferable. The above-mentioned internal crosslinking agents can be used by only one kind, or may be used in combination of two or more kinds.

Furthermore, the above-mentioned internal crosslinking agent is used in the range of preferably from 0.001 to 5 mol %, more preferably from 0.005 to 2 mol %, still more preferably from 0.01 to 1 mol %, particularly preferably from 0.03 to 0.5 mol % relative to the above-mentioned monomer except for the crosslinking agent, from the viewpoint of physical properties.

(c) Polymerization Initiator

The polymerization initiator used in the present invention is not especially limited, and is suitably selected from light decomposable polymerization initiators, thermal decomposable polymerization initiators or redox polymerization initiators and the like depending on the polymerization form.

Examples of the above-mentioned light decomposable polymerization initiators include benzoin derivatives, benzyl derivatives, acetophenone derivatives, benzophenone derivatives, azo compounds and the like, and examples of the above-mentioned thermal decomposable polymerization initiators include persulfate salts such as sodium persulfate, potassium persulfate and ammonium persulfate, peroxides such as hydrogen peroxide, t-butylperoxide and methyl ethyl ketone peroxide, azo compounds such as 2,2'-azobis(2-amidinopropane)dihydrochloride and 2,2'-azobis[2-(2-imidazolin-2-yl)propane]dihydrochloride, and the like. Furthermore, examples of the above-mentioned redox polymerization initiators include systems in which the above-mentioned persulfate salt or peroxide is used in combination with a reductive compound such as L-ascorbic acid or sodium hydrogen sulfite.

The above-mentioned light decomposable polymerization initiator can be used in combination with the thermal decomposable polymerization initiator. The above-mentioned polymerization initiator is used in the range of preferably from 0.0001 to 1 mol %, more preferably from 0.001 to 0.5 mol % relative to the above-mentioned monomer.

(d) Polymerization Method

The polymerization method applied in the present invention is preferably spray polymerization, drop polymerization, aqueous solution polymerization or reverse-phase suspension polymerization, more preferably aqueous solution polymerization or reverse-phase suspension polymerization, still more preferably aqueous solution polymerization from the viewpoints of water absorption property, easiness of control of polymerization and the like. Among these, continuous aqueous solution polymerization is particularly preferable, and the polymerization method may be either of continuous belt polymerization or continuous kneader polymerization.

As preferable embodiments of the above-mentioned continuous aqueous solution polymerization, continuous kneader polymerization is disclosed in U.S. Pat. Nos. 6,987,151 and 6,710,141, and the like, and continuous belt polymerization is disclosed in U.S. Pat. Nos. 4,893,999 and 6,241,928, U.S. Patent Application Publication No. 2005/215734, and the like, respectively. By adopting these continuous aqueous solution polymerizations, the producibility of the water absorbent resin is improved.

Furthermore, preferable examples of the above-mentioned continuous aqueous solution polymerization include high temperature-initiation polymerization and high concentration polymerization. The "high temperature-initiation polymerization" refers to a polymerization method in which polymerization is initiated at the temperature of a monomer aqueous solution of a temperature of preferably 30° C. or more, more preferably 35° C. or more, still more preferably 40° C. or more, particularly preferably 50° C. or more (the upper limit is a boiling point), and the "high concentration polymerization" refers to a polymerization method in which polymerization is conducted at a monomer concentration of preferably 30% by weight or more, more preferably 35% by weight or more, still more preferably 40% by weight or more, particularly preferably 45% by weight or more (the upper limit is a saturated concentration). High concentration-high temperature-initiation continuous aqueous solution polymerization using these polymerization methods in combination can also be used. The high temperature-initiation polymerization is disclosed in U.S. Pat. Nos. 6,906,159 and 7,091,253 and the like.

Although the above-mentioned polymerization can be conducted under an air atmosphere, it is preferable to conduct the polymerization under an inert gas atmosphere such as nitrogen or argon from the viewpoint of prevention of coloring. In this case, for example, the oxygen concentration is preferably controlled to be 1% by volume or less. Furthermore, it is preferable to sufficiently substitute the dissolved oxygen in the monomer or monomer aqueous solution with inert gas in advance (specifically, lower than 1 (mg/l) of dissolved oxygen).

Furthermore, the method of the present invention is effective in continuous production at a production amount of preferably 1 (t/hr) or more, more preferably 2 (t/hr) or more, still more preferably 4 (t/hr) or more.

(2-2) Gel-Crushing Step

This step is a step of conducting gel-crushing of the hydrogel obtained in the above-mentioned polymerization step by a gel-crushing apparatus such as a kneader, a meat chopper or a cutter mill to prepare a particulate hydrogel (hereinafter referred to as "particulate hydrogel"). In the case when the above-mentioned polymerization step is kneader polymerization, the polymerization step and gel-crushing step are simultaneously conducted. Furthermore, the above-mentioned hydrogel may be directly fed to the drying step without undergoing the gel-crushing step.

In this step, from the viewpoints of improvement of the gel-crushing property and improvement of the physical properties, water, polyvalent alcohols, mixed liquids of water and polyvalent alcohols, polyvalent metal (salt) aqueous solutions, or vapors thereof, and the like may also be added to the above-mentioned hydrogel.

In the present invention, from the viewpoints of the decrease of the residual monomer, prevention of gel deterioration (improvement of the urine resistance) and prevention of yellowing, the gel-crushing time (this refers to a time from the end of the polymerization to the initiation of the drying) is preferably a short time. Specifically, within 1 hour is preferable, within 0.5 hour is more preferable, and within 0.1 hour is still more preferable. Furthermore, the temperature of the hydrogel in the gel-crushing period is controlled (retained or heated) to be preferably from 40 to 95° C., more preferably from 50 to 80° C., still more preferably from 60 to 70° C.

The resin solid content of the particulate hydrogel after the above-mentioned gel-crushing is preferably from 10 to 90% by weight, more preferably from 20 to 80% by weight, still more preferably from 30 to 70% by weight, particularly preferably from 35 to 60% by weight. Furthermore, the particulate hydrogel has a weight average particle diameter (D50) (defined by sieve classification) is preferably from 0.2 to 10 mm, more preferably from 0.3 to 5 mm, still more preferably from 0.5 to 3 mm. In addition, the ratio of the particulate hydrogel having a particle diameter of 5 mm or more is preferably from 0 to 10% by weight, more preferably from 0 to 5% by weight of the entirety. The particle diameter of the particulate hydrogel is measured according to the wet classification method disclosed in paragraph [0091] of JP 2000-63527 A. The gel-crushing step is also referred to as a gel grain refining (crushing) step in some cases.

(2-3) Drying Step

This step is a step of drying the hydrogel and/or the particulate hydrogel obtained in the above-mentioned polymerization step and/or gel-crushing step to a desired resin solid content to give a dried polymer. The resin solid content is a value obtained from a drying loss (a weight change when 1 g of a sample is heated at 180° C. for 3 hours), and is preferably from 80% by weight or more, more preferably from 85 to 99% by weight, still more preferably from 90 to 98% by weight, particularly preferably from 92 to 97% by weight.

The drying method in the present invention may be any drying method as long as the hydrogel and/or particulate hydrogel can be dried to the above-mentioned resin solid content, and can be suitably selected from, for example, heat drying, hot air drying, reduced pressure drying, infrared ray drying, microwave drying, drum drier drying, azeotropic dehydration drying with a hydrophobic organic solvent or high-humidity drying by water vapor at a high temperature and the like. Among these, hot air drying is preferable, hot air drying using a gas having a dew point temperature of from 0 to 100° C. is more preferable, and hot air drying using a gas having a dew point temperature of from 20 to 90° C. is still more preferable.

Furthermore, the drying temperature is controlled (heated) to be preferably from 100 to 300° C., more preferably from 150 to 250° C. from the viewpoint of water absorption property or color hue, and especially, from the viewpoint of the balance of the physical properties and whiteness degree of the obtained water absorbent resin, it is preferable that the drying temperature is from 165 to 230° C. and the drying time is within 50 minutes, and the drying time is more preferably from 20 to 40 minutes. In the case when hot air drying is conducted, the temperature of the hot air is deemed as a drying temperature. When the above-mentioned drying temperature or drying time is out of the above-mentioned range, it is not preferable since decrease of the water absorption capacity without load (CRC) of the water absorbent resin, increase of the water soluble component, and decrease of whiteness degree may be caused.

(2-4) Pulverizing Step

This step is a step for obtaining a pulverized polymer by pulverizing the dried polymer obtained in the above-mentioned drying step. In the case when the shape of the hydrogel obtained in the polymerization step is particulate (for example, the polymerization step is spray polymerization, drop polymerization, reverse-phase suspension polymerization or the like), the pulverizing after the drying step is not conducted in some cases.

The apparatus used in the pulverizing step is not especially limited, and examples include a roll mill, a hammer mill, a roll granulator, a jaw crusher, a gyratory crusher, a cone crusher, a roll crusher, a cutter mill and the like. Among these, it is preferable to use a roll mill or a roll granulator at multi-stages from the viewpoint of control of particle size.

(2-5) Classification Step

This step is a step of obtaining a powder of the water absorbent resin by classifying the pulverized polymer obtained through the above-mentioned respective steps (polymerization step, gel-crushing step, drying step, pulverizing step).

The production method according to the present invention is a method for producing a polyacrylic acid (salt)-based water absorbent resin sequentially including a polymerization step, in which a monomer aqueous solution having acrylic acid (salt) as a main component is polymerized, a drying step, in which a water-containing gel-like crosslinked polymer obtained in the polymerization step is dried, and a classification step, in which a polymer obtained in the drying step is classified, wherein a rocking-type sieve classification apparatus is used in the classification step, and the rocking-type sieve classification apparatus has a sieve net having a trajectory and a rotation speed in the following ranges. The above-mentioned sieve net has a trajectory having a radial gradient R of from 5 to 40 mm, a tangential gradient T of from 0.1 to 25 mm and an eccentric gradient E of from 40 to 80 mm, and the sieve net has a rotation speed F of from 60 to 600 rpm.

The classification step, which is the characteristic part of the present invention, will be explained below.

(Classification Apparatus)

The rocking-type sieve classification apparatus (hereinafter also simply referred to as "classification apparatus") used in the present invention has a sieve net surface. The shape of the sieve net surface is suitably determined as a circular shape (circular sieve) or a square shape (square sieve) or the like. Among these, a circular sieve is preferable from the viewpoint of the strength of the sieve net.

Furthermore, the rocking-type sieve classification apparatus used in the present invention is not especially limited, as long as it controls three-dimensional movements by the combination of the radial gradient R, the tangential gradient T, the eccentric gradient E of the trajectory and the rotation speed F as mentioned below (the sieve net surface oscillates in a spiral manner). The specific methods for the measurement of the radial gradient R, the tangential gradient T and the eccentric gradient E in the trajectory of the classification apparatus will be explained in the following Examples by using FIGS. 1 and 2.

(Trajectory and Rotation Speed)

In the present invention, by controlling the oval trajectory (hereinafter referred to as "trajectory") (see, FIG. 2) of the rocking-type sieve classification apparatus to be within the following specific ranges, the liquid permeability of the water absorbent resin can be improved, and the fine powder can be decreased.

The above-mentioned "radial gradient R" refers to the width of the trajectory (R in FIG. 2), and affect the force that transfers a sample on the sieve net from the central part to the outer periphery part. In other words, this means the gradient of the sieve net at which the sample is dispersed from the central part of the sieve net to the periphery.

Figure 2:
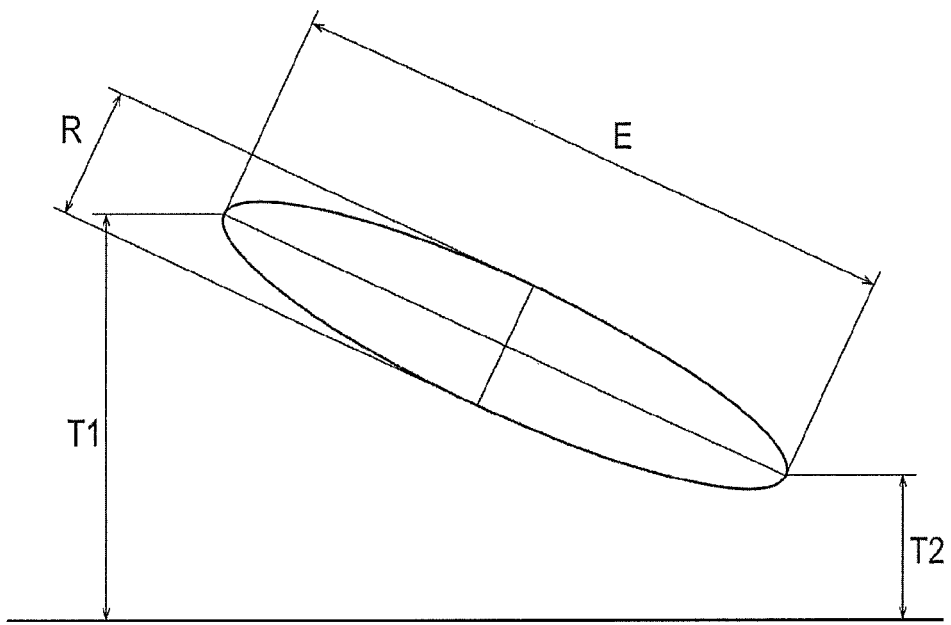
FIG. 2 is a drawing showing the trajectory, and the radial gradient R, tangential gradient T and eccentric gradient E of the sieve.

The above-mentioned "tangential gradient T" refers to the gradient of the trajectory (T1−T2 (=T) in FIG. 2), and affects the force that allows the circular movements of the sample on the sieve net. In other words, this means the gradient of the sieve net that controls the speed when the sample is ejected from the sieve net.

The above-mentioned "eccentric gradient E" refers to the traversal width of the trajectory, which corresponds to E of FIG. 2. This affects the exciting force that is applied to the sample on the sieve net together with "rotation speed F".

Among the above-mentioned parameters, the radial gradient R and the tangential gradient T mainly resonate, whereby the sample on the sieve net moves in a helical manner, and the classification can be efficiently conducted by controlling these to be within specific scopes.

In the present invention, the classification efficiency is improved by controlling the above-mentioned four parameters that control the movements of the rocking-type sieve classification apparatus to be within the following specific scopes, independently or in combination. As a result, the physical properties (especially liquid permeability) of the particulate water absorbing agent as a final product are improved.

Specifically, the radial gradient R is from 5 to 40 mm, preferably from 5 to 20 mm, more preferably from 5 to 15 mm. In the case when the above-mentioned radial gradient R is lower than 5 mm, the retention time of the sample on the sieve net is extended and the load on the sieve net increases, and thus the lifetime of the sieve net may be shorten. On the other hand, in the case when the radial gradient R exceeds 40 mm, the sample easily transfers to the periphery part of the sieve net and the ejection speed excessively increases, and thus the classification efficiency may be decreased. The radial gradient R can be adjusted by a weight that causes the classification apparatus to oscillate.

The tangential gradient T is from 0.1 to 25 mm, preferably from 2 to 20 mm, more preferably from 4 to 15 mm. In the case when the above-mentioned tangential gradient T is lower than 0.1 mm, "bounce" of the sample on the sieve net is small, and thus the classification efficiency may be decreased. On the other hand, in the case when the tangential gradient T exceeds 25 mm, the sample easily accumulates on the central part of the sieve net, and thus the ejection may become difficult. The tangential gradient T can be adjusted by the adjuster bolt and the like of the classification apparatus.

The eccentric gradient E is from 40 to 80 mm, preferably from 50 to 80 mm, more preferably from 50 to 70 mm. In the case when the above-mentioned eccentric gradient E is lower than 40 mm, the classification efficiency may be decreased. On the other hand, in the case when the eccentric gradient E exceeds 80 mm, the sample remaining on the sieve net may pass through the sieve net, or the classification apparatus may break down. The eccentric gradient E can be adjusted by a weight that causes eccentricity in the classification apparatus.

The rotation speed F is from 60 to 600 rpm, preferably from 100 to 500 rpm, more preferably from 150 to 400 rpm. In the case when the above-mentioned rotation speed F is lower than 60 rpm, decrease in the classification efficiency may be caused. On the other hand, when the rotation speed F goes beyond 600 rpm, the sample on the sieve net may be damaged, or the sieve net may become easy to break.

The combination of the above-mentioned four trajectory parameters is essentially R; from 5 to 40 mm, T; from 0.1 to 25 mm, E; from 40 to 80 mm, F; from 60 to 600 rpm, preferably R; from 5 to 20 mm, T; from 2 to 20 mm, E; from 50 to 80 mm, F; from 100 to 500 rpm, more preferably R; from 5 to 15 mm, T; from 4 to 15 mm, E; from 50 to 70 mm, F; from 150 to 400 rpm.

(Double Screen)

Although the above-mentioned trajectory of the rocking-type sieve classification apparatus can also be applied to an embodiment using a single sieve net, it is more preferable to apply the trajectory to an embodiment in which plural sieve nets having substantially the same opening are sequentially used. In the case when the sieve surface areas are the same, the surface area per one sieve net is large in a single sieve net, and thus the deterioration (net breakage, misalignment of openings, and the like) of the sieve net easily occurs within a short period, whereby the particle size becomes an unintended particle size, or breakage of the classification apparatus occurs, but such problems can be made difficult to occur by such embodiment.

The above-mentioned "substantially the same opening" refers to an opening within an allowable error range in various standard sieves such as JIS, ASTM and TYLER. In other words, it refers to an opening within a range of ±2% relative to an intended opening. Specifically, a preferable embodiment of the present invention is characterized in that two or more sieve nets each having an opening within a range of ±2% relative to an intended opening are used in the above-mentioned rocking-type sieve classification apparatus. The "intended opening" means a criterion size of an opening of a standard sieve.

In this embodiment, as long as two or more sieve nets each having substantially the same opening are used, a sieve net having an opening that is different from the opening may further be used in combination as a matter of course. For example, in the case when sieve nets having openings of 850 μm and 150 μm are used, combinations thereof include (1) a combination of two sieve nets of 850 μm and one sieve net of 150 μm, (2) a combination of one sieve net of 850 μm and two sieve nets of 150 μm, (3) a combination of two sieve nets of 850 μm and two sieve nets of 150 μm, and the like.

By employing a classification apparatus in which three sieve nets in total are simultaneously used by multi-stages in the combination of the above-mentioned (1), coarse particles can be especially classified with a fine efficacy. Furthermore, by employing a classification apparatus in which three sieve nets in total are simultaneously used by multi-stages in the combination of the above-mentioned (2), fine particles can be especially classified with a fine efficacy. In addition, by employing a classification apparatus in which four sieve nets in total are simultaneously used by multi-stages in the combination of the above-mentioned (3), coarse particles and fine particles can be classified with a fine efficacy, and thus a sharper particle size distribution can be obtained.

In the case when a plurality of sieve nets are used at multi-stages, the constitutions of the sieve nets are not especially limited, for example, the sieve nets for fine particles can be disposed on the upper stages and the sieve nets for coarse particles can be disposed on the lower stages. However, from the viewpoint of classification efficiency, it is preferable to dispose the sieve nets for coarse particles on the upper stages and dispose the sieve nets for fine particles on the lower stages.

The sieve nets that can be used in the present invention are not especially limited and may be either plate sieves or sieve nets, and the shapes of the sieve nets can be suitably selected referring to JIS Z8801-1 (2000), JIS Z8801-2 (2000) or the like. Furthermore, the opening of the sieve net can be suitably selected within the scope of preferably from 10 μm to 100 mm, more preferably from 50 μm to 50 mm, still more preferably from 100 μm to 15 mm. Furthermore, metal sieve nets are preferably used.

The above-mentioned "sieve nets for coarse particles" mean sieve nets for classifying coarse particles having large particle diameters. The opening (intended opening) is preferably from 600 to 1,000 μm, specifically 600 μm, 710 μm, 850 μm or 1,000 μm. These openings are used as the upper limit.

The above-mentioned "sieve nets for fine particles" mean sieve nets for classifying fine particles having small particle diameters. The opening (intended opening) is preferably from 106 to 212 μm, specifically 106 μm, 150 μm, 180 μm or 212 μm. These openings are used as the lower limit.

The upper and lower limits may be suitably selected from these sieve nets for coarse particles and sieve nets for fine particles depending on the classification efficiency and the like. Furthermore, sieve nets having three kinds of different openings may be used by adding a sieve net having an opening between these openings. The above-mentioned two or more sieve nets each having an opening within the scope of ±2% relative to an intended opening are preferably sieve nets for coarse particles or sieve nets for fine particles. In other words, in the case when two or more sieve nets each having an opening within the scope of ±2% relative to an intended opening are used, the intended opening is preferably from 600 to 1,000 μm or from 106 to 212 μm.

(Diameter of Sieve Net)

In the present invention, when the sieve classification apparatus is used, the diameter of the sieve net (in the case when the sieve is not circular, the diameter is converted to the diameter of a circle having the same surface area) is preferably 1 m or more, more preferably 1.5 m or more, still more preferably 2 m or more, particularly preferably 3 m or more as the lower limit. Furthermore, the upper limit is preferably 10 m or less, more preferably 8 m or less, still more preferably 6 m or less. Accordingly, the diameter of the sieve net is preferably from 1 to 10 m, more preferably from 1.5 to 8 m, still more preferably from 2 to 6 m. By setting the diameter of the sieve net to be within the above-mentioned range, the classification efficiency is improved, and thus the effect of the present invention is further exerted.

In the present invention, in the sieve net having a diameter within the above-mentioned range, it is more preferable to use sieve nets having the same opening by superposing the nets in multiple stages rather than using the sieve net in a single stage, since the liquid permeability of the water absorbent resin is improved and the fine powder is decreased.

(Support Material)

In the present invention, from the viewpoint of prevention of the deterioration (net breakage, misalignments of openings, and the like) of the above-mentioned sieve nets, it is preferable to dispose a support material for suppressing the bending and the like of the sieve nets during the classification. Specifically, a preferable embodiment of the present invention is characterized in that the support material is disposed on a position that is below the sieve net and inside of the frame of the sieve net.

Figure 3:
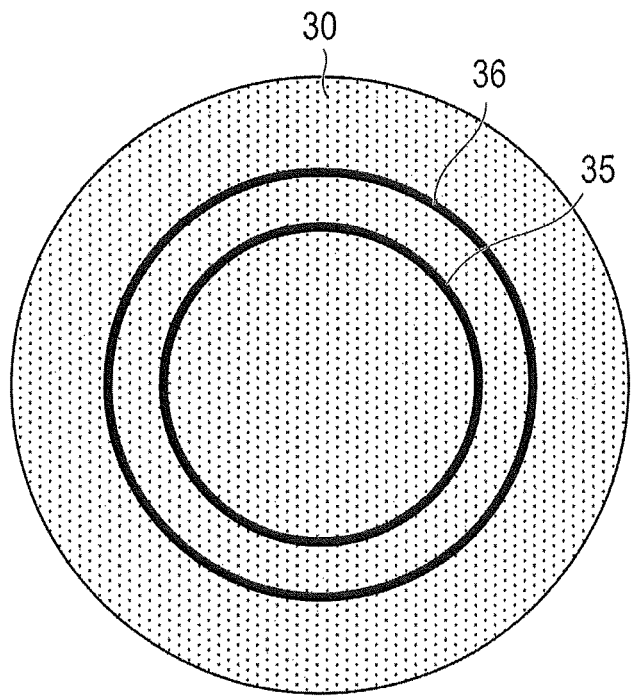
FIG. 3 is a drawing showing the positional relationship of the sieve net and the support material in an exemplary embodiment of the present invention.

The above-mentioned "support material" refers to an element that supports the sieve net from below, and is at least temporarily brought into contact with the sieve net during the classification period. The details will be explained in FIG. 3, which is a representative drawing. FIG. 3 is a drawing showing the positional relationship of the sieve net and the support materials according to an exemplary embodiment of the present invention.

In the embodiment of FIG. 3, the support materials each have a ring shape, but the shape is not especially limited as long as the bending of the sieve nets can be suppressed, and the shape may have various shapes such as a straight line, a curve, a ring, a helical shape, and a polygonal shape. Among these, from the viewpoints of maintenance of the classification efficiency and effective prevention of the deterioration of the sieve net (net breakage, misalignment of the openings and the like), a ring shape is preferable.

The number of the support materials is also not especially limited, and for example, in the case when a ring-shaped support material is used in a sieve net having a diameter in the above-mentioned range, the number of the support materials is preferably 2 or more from the viewpoint of effective prevention of the deterioration of the sieve net (net breakage, misalignment of the openings and the like), and is more preferably 2 from the viewpoint of maintenance of the classification efficiency.

Furthermore, the ring-shaped support materials are disposed on the circular sieve net in FIG. 3, and the support materials are disposed on the concentric circles of the sieve net. In the case when the sieve net is circular (a circular sieve), it is preferable that at least one support material is disposed on a position of from 0.20 to 0.60, preferably from 0.45 to 0.55 from the center when the distance from the center of the sieve net to the outer periphery (the radius of the sieve net) is deemed as 1. Furthermore, in the case when two support materials are used, one is disposed on the above-mentioned position, and the other is disposed on a position of from 0.61 to 0.85, preferably from 0.70 to 0.80 from the center. By disposing in such way, the deterioration (net breakage, misalignment of the openings and the like) of the sieve net is effectively prevented.

The support material has a height of preferably from 20 mm to 35 mm, and a width of from 2 mm to 6 mm. Furthermore, it is preferable that the support material is formed of a rubber, or the surface thereof is coated with a rubber. Furthermore, the gap between the sieve net and the support material is preferably 0 mm (no gap) or more and 5 mm or less, more preferably 0 mm (no gap) or more and 3 mm or less under a state in which the sieve net has no bending. By such embodiment, the deterioration (net breakage, misalignment of the openings and the like) of the sieve net can be effectively suppressed.

(Tapping Material)

In the classification step of the present invention, it is preferable that a tapping material is used, from the viewpoints of the classification efficiency of the water absorbent resin powder, the improvement of the physical properties (especially, the physical properties of the water absorbent resin after surface cross-linking, among these, the water absorption capacity under load (for example, AAP) and the liquid permeability (for example, SFC)) of the obtained water absorbent resin. The tapping material refers to an elastic material that is used to prevent the clogging of a sieve, and for the shape of the tapping material, any shape can be utilized as long as it is a rolling shape such as a spherical shape, a spheroid, or a polyhedral shape. Preferably, at least one selected from a tapping ball (spherical shape), a tapping block (spherical shape) and a tapping brush is used, and more preferably, a tapping ball or a tapping block is used, and still more preferably, a tapping ball is used.

In the rocking-type sieve classification apparatus used in the present invention, in the case when a plurality of sieve nets is used, the tapping material may be used on only a part of sieve nets, or may be used on whole sieve nets. It is preferable that the tapping material is used on at least one of the sieve nets having an intended opening of 300 µm or less, and it is still more preferable to use the tapping material on 30% or more, 50% or more, 70% or more, 90% or more, 100% of the sieve nets in this order relative to the whole number of the sieve nets.

The method for using the tapping material is not especially limited, and for example, a method in which a sieve net having an opening that is equal to or more than the opening of the sieve net, or a punching metal having a pore size that is equal to or more than the opening of the sieve net is further disposed below the sieve net, and the tapping material (preferably tapping balls or tapping blocks) is filled on the sieve net or punching metal is exemplified. It is preferable to use the tapping material on a punching metal from the viewpoint of classification efficiency.

Especially, as mentioned above, in the case when the support material is disposed on a position that is below the sieve net and the inside of the frame of the sieve net, it is preferable that the support material is attached to the upper part of the punching metal. In other words, a preferable embodiment of the present invention is characterized in that in the above-mentioned rocking-type sieve classification apparatus the punching metal is disposed below the sieve net, the support material is attached to the upper part of the punching metal, and the sieve net is disposed above the support material. In this case, the tapping material can be disposed between the sieve net and the punching metal.

Although the material of the above-mentioned tapping material is not especially limited, it is preferable that the tapping material is made of a resin, and examples include natural rubbers, urethanes, chloroprene rubbers, silicone resins and the like. Among these, it is preferable to use a white or opaque tapping material, especially a natural white rubber, a white urethane or the like, with consideration for adherence, incorporation or the like of the tapping material to a white water absorbent resin. The compression elastic modulus (Young's modulus) of these resins is preferably from 0.05 to 1.0 GPa, more preferably from 0.06 to 0.5 GPa.

Furthermore, the size and shape of the tapping material are suitably determined depending on the desired physical properties of the water absorbent resin, and the shape is preferably a block shape or a spherical shape, and the diameter thereof is preferably from 5 to 200 mm, still more preferably from 10 to 100 mm, and particularly preferably from 20 to 60 mm. In addition, a tapping ball or a tapping block having a different diameter may also be used in combination as long as the diameter is within the above-mentioned scope. When a tapping block is used, the volume thereof is converted to a sphere, and the diameter is obtained.

In the present invention, it is preferable to use plural tapping materials (tapping balls or tapping blocks or the like). The use amount of the tapping material of the present invention is defined by the cross-sectional surface areas of the tapping balls relative to the surface area of the metal sieve net, and is preferably 1% or more, and is preferably 5% or more, 10% or more, 15% or more, 20% or more in this order, and the upper limit is preferably lower than the closest pack, more preferably 70% or less with consideration for the gaps among the tapping balls. The use amount is suitably determined within these scopes.

Figure 4:
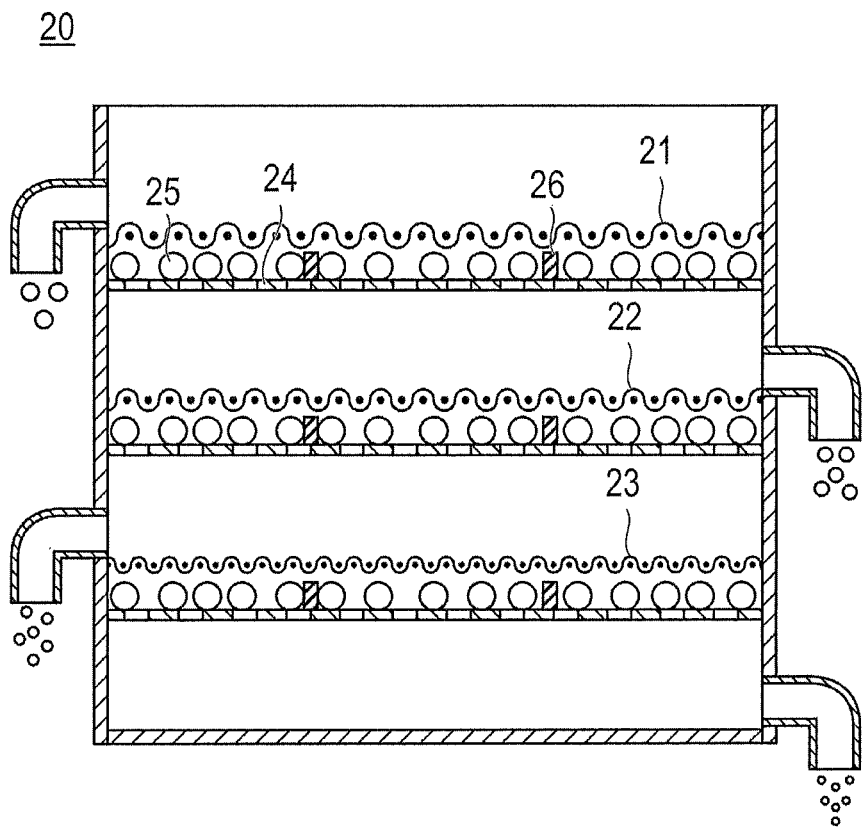
FIG. 4 is a cross-sectional drawing that schematically shows the rocking-type sieve classification apparatus in an exemplary embodiment of the present invention.

The water absorbent resin powder classified by using the tapping material may be fed to the next step by passing through the sieve net in which the tapping material is filled (mounted) or the punching metal, preferably the punching metal (see FIG. 4).

In the rocking-type sieve classification apparatus 20 shown in FIG. 4, a punching metal 24 is disposed below each of three sieve nets 21 to 23 having different openings, and a support material 26 is attached to the upper part of the punching metal 24. The sieve nets 21 to 23 are each disposed above the support material 26. Furthermore, tapping balls 25 are filled on the punching metal 24 (i.e., the tapping balls 25 are disposed between each of the sieve nets 21 to 23 and the punching metal 24). The openings of the three sieve nets 21 to 23 stepwise decrease from the top to the bottom, and for example, the openings of the three metal sieve nets 21, 22 and 23 are 1,000 μm, 850 μm and 100 μm, respectively.

The sieve net or punching metal on which the tapping material is filled (mounted) is installed below the sieve net used for classification of the water absorbent resin (hereinafter also referred to as "sieve net for classification"), and thus the shape thereof is preferably substantially the same as that of the sieve net used for classification. For example, in the case when the sieve net used for classification is circular, it is preferable that the sieve net on which the tapping material is filled (mounted) or the punching metal is similarly circular.

The pore size of the above-mentioned punching metal may be any diameter as long as it is smaller than diameter of the tapping material, and is preferably 5 mm or more, still more preferably 10 mm or more. The upper limit of the pore size of the punching metal is not especially limited, and is preferably 30 mm or less. Furthermore, from the viewpoint of classification efficiency, the punching metal has a pore size of preferably 5 times or more, more preferably 6 times or more and 20 times or less relative to the opening of the sieve net used for classification.

Furthermore, the open pore rate of the punching metal is preferably from 15 to 50%, more preferably from 20 to 45%, still more preferably from 25 to 40%. The above-mentioned open pore rate is determined by pores, pitch (P) or the like, and in the case when a certain area does not have pores, for example, when the punching metal has a frame, the open pore rate is defined by a surface area including that part. If the open pore rate is in the above-mentioned range, the physical property of the water absorbent resin and classification efficiency can be improved.

Furthermore, the distance (gap) between the sieve net used for classification on the upper side and the sieve net or punching metal installed below is suitably determined, and is generally preferably from 1.1 to 5 times, more preferably from 1.2 to 3 times, and still more preferably from 1.3 to 2 times relative to the diameter of the tapping material, from the viewpoint of the improvement of the classification efficiency and the physical properties of the obtained water absorbent resin.

Furthermore, in the present invention, the tapping material is installed on the punching metal or the like disposed below the sieve net used for classification, and is preferably installed on the entirety of the punching metal or on the punching metal that is partitioned into plural compartments in the plane direction (see FIG. 4).

Figure 5:
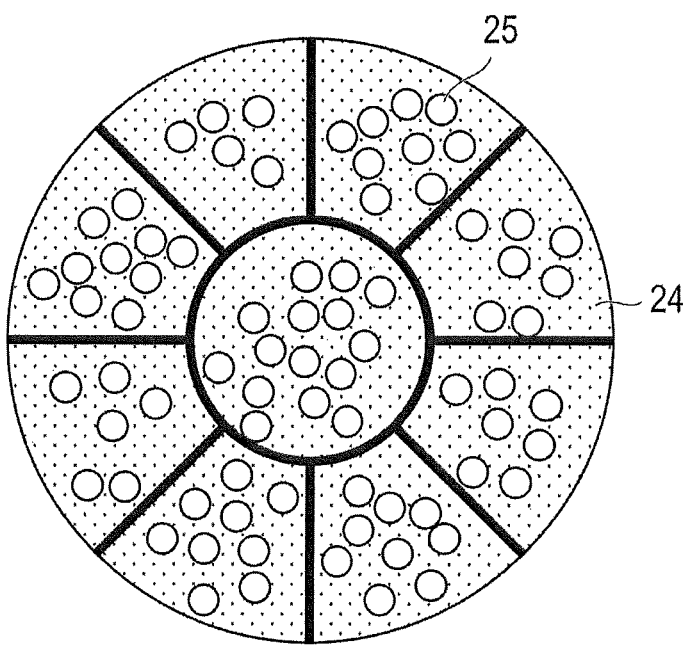
FIG. 5 is a schematic cross-sectional drawing in which an aspect in which tapping balls are installed on a punching metal that is divided into a plurality of compartments is seen from above.

As shown in FIG. 5, in the case when the punching metal that is partitioned into a plurality of compartments (segmented screens) is used, the manner of partitioning is suitably determined and is not especially limited, and for example, in the case of a circular punching metal, the punching metal can be partitioned into two partitions, four partitions or eight partitions, or the central part can be partitioned into circular shapers. Furthermore, by using these in combination, the punching metal can be partitioned into 2 to 100 partitions, preferably 4 to 50 partitions, more preferably 8 to 40 partitions. The sizes and shapes of the respective compartments, as well as the tapping materials to be installed into the respective compartments may be all the same or different.

In the present invention, in the case when the above-mentioned support material is present on the sieve net, the support material can be used as a partition for the tapping balls. On the other hand, in the case when a material other than the above-mentioned support material is used as a partition, the damage (breakage) of the sieve net is concerned due to contact with the sieve net. Therefore, it is necessary to install a partition so as to avoid contact with the sieve net during the classification period.

In the present invention, it is preferable that the tapping material during the classification is heated from the viewpoints of the improvement of the physical properties of the obtained water absorbent resin and the improvement of the producibility. The heating temperature is preferably 40° C. or more, more preferably 50° C. or more, still more preferably 60° C. or more. The upper limit of the heating temperature is suitably set, but it is concerned that undue heating decreases the effect of the tapping material and shortens the lifetime of the tapping material; therefore, the heating temperature is generally preferably 150° C. or less, more preferably 120° C. or less, still more preferably 100° C. or less, particularly preferably 90° C. or less, and most preferably 80° C. or less. Therefore, as the temperature of the tapping material, for example, 40 to 100° C., 50 to 100° C., 60 to 100° C. or the like can be selected, but the temperature is not limited to these ranges and defined by an optional range selected from the upper limit value and lower limit value of the above-mentioned heating temperature.

In order to heat the tapping material in the present invention to the above-mentioned temperature range, it is sufficient to heat the tapping material from outside, and it is sufficient to heat the inside of the sieve net, the surface of the sieve net, and the water absorbent resin to a predetermined temperature as a heat source thereof to thereby control the contact time with the tapping material and the contact amount (for example, the flow amount of hot air onto the sieve net, the flow amount or the retention amount of the water absorbent resin on the sieve net, and the like).

In the present invention, since the tapping material is worn away over used time, it is preferable to periodically replace the tapping material in accordance with the wearing of the tapping material. The wearing of the tapping material can be figured out by, for example, the amount of decrease of the diameter in the case of a spherical shape, and it is sufficient that the tapping material is replaced at the time when the amount of decrease of the diameter has become 3% or more, preferably 5% or more, more preferably 10% or more, still more preferably 20% or more. In the case when the tapping material is not periodically replaced, the physical properties of the water absorbent resin may sometimes decrease gradually over the lapse of the operation time. Furthermore, the time (period) for replacement is suitably determined, and it is sufficient to replace the tapping material after a substantially continuous operation over, preferably 30 days to 2 years, more preferably 60 days to 1 year. The "substantially continuous operation" means a state in which a continuous operation is conducted over 80% or more, 90% or more, or 95% or more of the operation period even in the case when some rest or switching is included.
(Guide)

In the present invention, a guide may be installed on the sieve net of the rocking-type sieve classification apparatus.

The above-mentioned "guide" refers to an apparatus that guides the sample on the sieve net so that the distance to be sieved becomes long. This guide enables more efficient classification. On the other hand, it is possible that the sieve net is brought into contact with the guide to thereby cause the breakage of the sieve net. Therefore, it is preferable that no guide is installed, or that the length of the guide is set to be 1 to 40% of the diameter of the sieve net.
(Material and Surface Roughness)

In the present invention, the material for the rocking-type sieve classification apparatus (especially the sieve net) is not especially limited, and is suitably selected from a material made of a resin or made of a metal, or the like, and the rocking-type sieve classification apparatus is preferably made of a metal, more preferably made of a stainless, including the contact surface with the water absorbent resin, from the viewpoint of the physical properties of the water absorbent resin. Furthermore, the physical properties of the water absorbent resin are further improved by mirror-like finishing of the stainless steel. Examples of the stainless steel include SUS304, SUS316, SUS316L and the like.

Furthermore, it is preferable to control the surface roughness (Rz) (defined by JIS B 0601-2001) of the inner surface of the above-mentioned rocking-type sieve classification apparatus (especially the sieve net), and it preferably smoothened to a specific numerical value of preferably 800 nm or less, more preferably 150 nm or less, still more preferably 100 nm or less, particularly preferably 50 nm or less. On the other hand, the lower limit value is preferably 0 nm, but there is no significant difference even when the lower limit value is 10 nm or 20 nm, and the lower limit value is sufficient at substantially about 20 nm.

The above-mentioned "surface roughness (Rz)" means the maximum value of the maximum height (μm) on the concavo-convex of the surface, and is measured by using a stylus-type surface roughness meter.
(Temperature of Apparatus)

In the present invention, when the rocking-type sieve classification apparatus is used, it is preferable that the classification apparatus is used in a state in which the apparatus is heated and/or a state in which the apparatus is kept warm.

The above-mentioned "state in which the apparatus is heated" means that heat is positively provided to the classification apparatus. Therefore, it is a concept that includes the case when heat is applied to the classification apparatus to thereby raise the temperature to a predetermined temperature, and thereafter no heat is applied, the case when heat is constantly applied to the classification apparatus, and the like.

The above-mentioned "state in which the apparatus is kept warm" means that the apparatus is made difficult to release heat, i.e., decrease in temperature is suppressed as possible.

In order to put the above-mentioned classification apparatus into the state in which the apparatus is heated and/or warmed, it is sufficient to raise the atmosphere temperature of the part where the classification apparatus is installed, or to cover the classification apparatus with an adiabatic material or the like, or the like. The temperature of the classification apparatus (the temperature of the sieve net) at this time is preferably from 40 to 80° C., more preferably from 45 to 60° C. If the temperature is 40° C. or more, the physical properties of the water absorbent resin are difficult to decrease. On the other hand, when the temperature is 80° C. or less, the classification efficiency is not deteriorated, whereas when the temperature goes beyond 80° C., it is not advantageous in view of cost efficiency.

The temperature difference ($\Delta T$) between the temperature of the pulverized polymer (water absorbent resin) that is fed to the above-mentioned classification apparatus and the temperature of the classification apparatus is preferably 20° C. or less, more preferably 10° C. or less. In the case when the water absorbent resin is produced at an industrial scale, it is desirable that the pulverized polymer (water absorbent resin) is warmed to preferably room temperature or more, more preferably from 40 to 100° C., still more preferably from 50 to 80° C., from the viewpoint of the fluidity of the water absorbent resin.
(Reduced Pressure)

In the present invention, it is preferable that the classification step is conducted under a reduced pressure from the viewpoint of the improvement of the physical properties of the water absorbent resin after the surface cross-linking.

The above-mentioned "under a reduced pressure" means a state that the pressure of the atmosphere is lower than the atmospheric pressure, and is expressed by "reduced pressure degree" as a positive value. For example, in the case when the atmospheric pressure is the standard atmospheric pressure (101.3 kPa), "reduced pressure degree; 10 kPa" refers to that the atmospheric pressure is 91.3 kPa.

The lower limit value of the above-mentioned reduced pressure degree is preferably more than 0 kPa, and is more preferably 0.01 kPa or more, still more preferably 0.05 kPa or more. On the other hand, the upper limit value of the reduced pressure degree is preferably 10 kPa or less, more preferably 5 kPa or less, still more preferably 2 kPa or less, from the viewpoints of prevention of the raising of the water absorbent resin in the classification apparatus, decreasing of the cost for a gas discharging apparatus, and the like. Therefore, as a preferable range of the reduced pressure degree, an optional range can be selected from the above-mentioned upper and lower limit values.
(Airflow)

In the present invention, when the sieve classification apparatus is used, it is desirable to run a gas (especially air), preferably into the classification apparatus, more preferably on the water absorbent resin in the classification apparatus, from the viewpoints of classification efficiency and decreasing of a fine powder.

In this case, the amount of the gas to be run (hereinafter referred to as "airflow") is not especially limited, and is preferably from 0.1 to 10 (m$^3$/hr), more preferably from 0.5 to 5 (m$^3$/hr), still more preferably from 1 to 3 (m$^3$/hr) relative to 1 m$^2$ of the sieve net surface area. The volume of the gas is measured under standard conditions (for example, ambient temperature: 25° C., 1 atm).

The temperature of the above-mentioned airflow is not especially limited, and is preferably from 40 to 120° C., more preferably from 50 to 110° C., still more preferably from 60 to 100° C., particularly preferably from 65 to 90° C., and most preferably from 70 to 80° C. before the airflow is introduced into the classification apparatus.

The water content of the above-mentioned airflow is not especially limited, and is preferably 5 (g/kg) or less, more preferably 4.5 (g/kg) or less, still more preferably 4 (g/kg) or less, particularly preferably 3.5 (g/kg) or less, most preferably 3 (g/kg) or less before the airflow is introduced into the classification apparatus.

A gas with a low water content is produced by cooling the gas, and condensing the corresponding water content. Specifically, it is sufficient to dry the gas, and the method therefor include methods using a membrane drier, an adsorption drier, a diaphragm drier, and methods using these in combination. In the case when the above-mentioned adsorption drier is used, either of a heating-recycling type, a non-heating-recycling type or a non-recycling type can be adopted.

The dew point of the above-mentioned airflow is not especially limited, and is preferably 20° C. or less, more preferably 15° C. or less, still more preferably 10° C. or less, and particularly preferably 0° C. or less. The lower limit value of the dew point is not especially limited, and is preferably about −5° C. from the viewpoint of cost. The above-mentioned dew point can be adjusted by suitably adjusting the airflow amount and water content of the airflow to be introduced into the classification apparatus depending on the purpose.

(Removal of Electricity)

In the present invention, removal of electricity is conducted preferably in the classification step, and removal of electricity is further conducted also in the pulverizing step. The removal of electricity in the classification step can be conducted on the classification apparatus, water absorbent resin or sieve net, and it is sufficient to subject any one of these to removal of electricity since these are in contact with one another, and it is preferable to subject the classification apparatus or sieve net to removal of electricity.

As the methods for the above-mentioned removal of electricity, the following methods (A) to (C) are applied, but the methods are not limited to these. Furthermore, either one of the methods (A) to (C) may be used, or two or more may be used in combination. The leaked electrical current removed by the removal of electricity is flown into the earth through a grounding wire represented by the following grounding resistance value.

Method (A): Removal of Electricity by Electricity-Removal Brush

The method (A) is a method for removal of electricity by using an electricity-removal brush from the surface of the sieve on which static electricity has been generated, and examples include a self-discharging process in which a gap is formed between an electricity-removal brush and a charged object, and a ground leakage method of removing electric charge by bringing a grounded (earthed) electricity-removal brush into contact with a charged object, and removing the accumulated static electricity as a leak current.

As specific examples of such an electricity-removal brush, brushes produced from a stainless steel fiber, a carbon fiber, an amorphous fiber, a chemical fiber, a plant fiber, animal hair, and the like are preferred, and the wire diameter is preferably 1 μm to 100 μm, and more preferably 5 μm to 20 μm. Further, the wire length is preferably 1 mm to 100 mm, and stainless steel extra-fine processing is particularly preferred.

Method (B): Removal of Electricity by Ion-Generating Brush

The method (B) is a method for removing electricity by applying a high voltage to allow generation of ion, and is a method for electrically neutralizing charged electrical charge. Specifically, it is a method including measuring the charged amount and charged electrical charge of the classification apparatus, water absorbent resin or sieve net, and attaining an electrically neutral state by applying an opposite charge to the + charge or − charge. Therefore, a balance may be achieved between the optimal removal of electricity in accordance with the condition of electrification of an object and the control of ion balance.

The amount of electric charge of the object may be measured by measuring the ion current by using anion current detection circuit mounted in the controller. As such, the method (B) of completely deactivating static electricity by neutralizing the charge with a charge of reverse polarity is a preferably applied to water absorbent resins. Such removal of electricity can be conducted by an electricity removal apparatus (ionizer).

Method (C): Removal of Electricity by Ground Connection (Earth)

The method (C) is a method for removing electricity by ground connection (earth) of static electricity that has been generated on an apparatus (a rotating object, a rotation axis, a rotor or the like). Specifically, this method is a method of removing of electricity by electrically connecting a building or a stand, on which the classifying apparatus is installed, to an earth exhibiting the ground resistance value described below, and extracting the accumulated static electricity from the apparatus or the like as a leak current. The method (C) is simple and easy, and removal of electricity is highly effective because the classifying apparatus as a whole works as a removing of electricity apparatus, and thus it is one of the preferable methods.

The above-mentioned "ground resistance value" means a resistance value against a current that flows from an earth electrode buried in the soil for a ground connection to the ground. The ground resistance value is preferably 100Ω or less, more preferably 10Ω or less, still more preferably 5Ω or less. The ground resistance value can be measured by a commercially available ground resistance meter.

By conducting the above-mentioned removal of electricity, the physical properties (especially liquid permeability) of the surface-crosslinked water absorbent resin are improved. Such effect is more significantly exerted in the case of a large scale of industrial continuous production (for example, continuous production by a production amount per 1 hour of 1 t or more and for 24 hours or more) than in a small scale at a laboratory level.

(Classification Aid)

In the present invention, from the viewpoints of classification efficiency and improvement of producibility, a modifier (for example, a surfactant, a powdery lubricant, or the like) can be added as a classification aid so as to increase the fluidity of the water absorbent resin.

The above-mentioned classification aid improves the fluidity of the water absorbent resin, but in the case when the number of the sieve nets is a single number, the transfer speed on the sieve net becomes fast and the retention time is shorten, and thus decrease in the classification efficiency is sometimes caused. However, the retention time is extended by using a plural number of sieve nets having substantially the same opening as a more preferable embodiment of the present invention, and thus the above-mentioned phenomenon is alleviated, and this may advantageously act on the improvement of the classification efficiency by the addition of the classification aid.

(Frequency of Classification Step)

It is sufficient that the present invention has at least one (one portion) classification step on the whole steps for the production of the water absorbent resin, and may have preferably 2 times (2 portions) or more, more preferably at least one time (one portion) or more before and after the surface cross-linking step, and where necessary, 3 to 6 times (3 to 6 portions) of classification steps may also be set.

It is preferable to conduct the classification step before the surface cross-linking step since the particle size of the final product can be adjusted to be within a desired range. Furthermore, the classification step after surface cross-linking is preferable since it can remove flocculated particles that have particle sizes out of the defined particle size, which are generated during the surface crosslinking agent mixing or heating treatment, or fine particles that are out of the definition and that are generated by physical and mechanical breaking, by classification, whereby a water absorbent resin having excellent performances can be obtained.

(Intended Particle Size)

It is preferable that the water absorbent resin powder obtained in the above-mentioned series of operations (from the polymerization step to the classification step) has the following particle size.

In other words, the weight average particle diameter (D50) is preferably from 200 to 600 μm, more preferably from 200 to 550 μm, still more preferably from 250 to 500 μm, and particularly preferably from 350 to 450 μm. Furthermore, it is preferable that the content of the fine particles having a particle diameter of lower than 150 μm is lower, and the content is preferably from 0 to 1% by weight, more preferably from 0 to 0.8% by weight, still more preferably from 0 to 0.6% by weight. On the other hand, it is preferable that the content of the coarse particles having a particle diameter of more than 850 μm is lower, and the content is preferably from 0 to 10% by weight, more preferably from 0 to 5% by weight, still more preferably from 0 to 3% by weight, particularly preferably from 0 to 1% by weight. In addition, the logarithmic standard deviation ($\sigma\zeta$) of particle size distribution is preferably from 0.25 to 0.45, more preferably from 0.30 to 0.40.

The above-mentioned particle size is measured by using a standard sieve (JIS Z8801-1(2000)) according to WO 2004/069915 or EDANA-ERT420.2-02 ("PSD").

(Washing)

In the classification step in the present invention, the water absorbent resin is classified by using the sieve net as mentioned above, and as a further preferable exemplary embodiment, it is desirable to wash the sieve net (classification apparatus), at every predetermined period, especially with water. Namely, a preferable embodiment of the present invention is characterized in that the above-mentioned sieve net is washed at every predetermined period. The washing in the classification apparatus will be described in detail, but the washing is not limited to the classification apparatus and is suitably applied to other apparatuses.

The substance to be removed by the washing is a powdery water absorbent resin (typically a substance that has passed through a JIS standard sieve with an opening of 1,000 μm), especially a fine particulate water absorbent resin (a substance that has passed through a JIS standard sieve with an opening of 150 μm), a flocculate thereof, or a flocculate formed of a mixture of a powdery water absorbent resin or a fine particulate water absorbent resin and water, which is adhered to the apparatus for producing a water absorbent resin. The above-mentioned flocculate is generated by the step of adding water or an aqueous solution to the water absorbent resin, condensed water in the apparatus, or the like.

(A) Washing Method

The method for washing the classification apparatus in the present invention is not especially limited, and the washing may be conducted while continuing the production of the water absorbent resin, or the washing may be conducted after temporarily or periodically stopping the production of the water absorbent resin. It is also preferable to prepare a plurality lines of classification apparatuses, and to conduct washing while substantially continuing the production of the water absorbent resin by replacing one apparatus with another apparatus (spare apparatus) when one apparatus is washed.

Examples of the above-mentioned method for washing while continuing the production of the water absorbent resin include a method of continuously spraying the following washing water onto the classification apparatus, a method of spraying the following washing water while continuously conducting drying, and the like. Furthermore, examples of the method of washing after temporarily or periodically stopping the production of the water absorbent resin include a method of washing a part or the whole part of the apparatus by periodically stopping the classification apparatus, and the like. Furthermore, in the case when the above-mentioned washing is conducted, the subject apparatus can be directly washed, or a part or the whole part of the subject apparatus may be taken apart and washed during overhaul or the like. During the continuous production, the same water absorbent resin may be produced under substantially the same production conditions, or different water absorbent resins may be produced by modifying the production conditions.

Furthermore, the above-mentioned washing may be conducted by directly spraying or spraying by a shower the following washing water onto the classification apparatus, or the apparatus may be immersed in washing water, or washed by wiping with water, a water brush or the like, or these methods may be used in combination. Among them, from the viewpoint of washing efficiency, a method by immersing in washing water or a method by spraying of washing water is preferable. The above-mentioned washing may be repeatedly conducted several times. Furthermore, the portion to be washed is not only one portion, and it is preferable to wash plural portions, and it is more preferable to wash other production apparatus including the classification apparatus (especially sieve net) in the classification step.

Furthermore, the above-mentioned washing can be conducted either under an ordinary pressure, under load or under a reduced pressure, and is not especially limited. In the case when liquid water is used, the boiling point of the water may be varied up and down by several degrees from 100° C. (the boiling point at an ordinary pressure) by atmospheric pressure, the following additives or the like, but from the viewpoint of cost-effectiveness, the washing is conducted preferably at under an ordinary pressure or a pressure of ±5% of the ordinary pressure, more preferably a pressure of ±1% of the ordinary pressure (within a general scope of change in atmospheric pressure).

(B) Washing Water

In the present invention, the water used in the washing (hereinafter sometimes referred to as "washing water") is not limited to water alone (100% by weight of water), and a small amount of solvent or additive can be added so as to increase the washing effect. Therefore, the content ratio of the water is preferably 90% by weight or more, more preferably 95% by weight or more, still more preferably 99% by weight or more, particularly preferably 99.9% by weight or more, and most preferably substantially 100% by weight. Furthermore, the above-mentioned water is not especially limited, and can be suitably selected from industrial pure water, tap water, groundwater, distilled water, ion exchanged water, rainwater and the like.

Furthermore, the above-mentioned solvent is not especially limited, and examples include water-soluble organic solvents such as methanol, ethanol, isopropanol and acetone, and preferable examples include low boiling point water-soluble organic solvents having a boiling point of from 30 to 100° C., and the like. Furthermore, the above-mentioned additive is not especially limited, and examples include alkali metal salts such as sodium chloride and sodium sulfate; alkali earth metal salts such as potassium chloride and magnesium chloride; polyvalent metal salts having tri- or more valency such as aluminum sulfate; bases such as sodium carbonate, sodium hydrogen carbonate and sodium hydroxide; various surfactants; builders and the like. From the viewpoint of washing effect, these inorganic salts and/or alkaline aqueous solutions may be used in combination, but water within the above-mentioned range is used from the viewpoints of cost-effectiveness, contamination in the water absorbent resin, and the like.

The form of the above-mentioned washing water is not especially limited, and gaseous or liquid water can be used, and use of liquid water (especially warm water) is preferable from the viewpoints of handleability and safeness. The temperature of the washing water is suitably determined within a range from more than the solidification point and up to the boiling point, and is preferably more than room temperature (20 to 25° C.) and up to the boiling point, more preferably from 30 to 100° C., still more preferably from 35 to 100° C., particularly preferably from 40 to 95° C., and most preferably from 45 to 90° C. from the viewpoints of washing effect. Furthermore, in the case when water vapor is used as the gaseous water, it is water vapor heated at an ordinary pressure having a temperature of preferably 500° C. or less, more preferably 300° C. or less, still more preferably 200° C. or less. In the case when the temperature of the washing water is lower than the above-mentioned range, it is not preferable since the washing effect is lowered. On the other hand, in the case when the temperature of the washing water is higher than the above-mentioned range, an effect that commensurate with a means such as raising of a boiling point by use of an additive, cannot be obtained, and this is not preferable since the workability is deteriorated and the risks of burn and the like increase.

Furthermore, the above-mentioned washing water may be pressurized and used (hereinafter referred to as "pressurized waterflow"). The load degree in this case may be a pressurized waterflow at a ultrahigh pressure (gauge pressure 500 (kg/cm$^2$)), and a pressurized waterflow at a gauge pressure of from 1 to 400 (kg/cm$^2$) is preferable, and a pressurized waterflow at a gauge pressure of from 5 to 200 (kg/cm$^2$) is more preferable from the viewpoint of washing effect. Accordingly, any equipment for obtaining a ultrahigh pressure water flow is not required.

Furthermore, the above-mentioned pressurized waterflow can be sprayed by using a plane nozzle, a rotation nozzle or a pressure system nozzle. The apparatus for generating a pressurized waterflow is not especially limited, and examples can include commercially available apparatuses such as a high pressure washing apparatus manufactured by Sugino Machine Ltd., a station type ultrahigh pressure washing unit manufactured by Tokyo Isuzu Motor Co., Ltd., an automatic high pressure washing system manufactured by KIT, a cleaning system manufactured by URACA, and a warm water high pressure washing machine by Karcher. A suitable equipment may be suitably selected depending on the production apparatus to be subjected to washing with water.

(C) Immersion

In the present invention, "immersion" means a method of immersing the whole part or a part or decomposition of the production apparatus in an excess amount of water (washing water), whereby the water absorbent resin adhered to a place where physical removal is difficult such as a dead space is allowed to swell and made easy to be removed.

The immersion time is not especially limited, and is preferably from 1 minute to 10 days, more preferably from 1 hour to 5 days, still more preferably from 2 hours to 3 days. The immersion time is suitably determined within the above-mentioned range.

Furthermore, the washing water during the immersion may be either static (not stirred) or dynamic (stirring including waterflow or the like). The washing water after the immersion may be suitably replaced or partially replaced (overflow), and may be recycled plural times.

(D) Cycle of Washing

In the case when the apparatus is washed at every predetermined period, the cycle is not especially limited, and can be suitably selected at, for example, every 12 hours, every 1 day, every 10 days, every 30 days, every 60 days, every 120 days, every 150 days or the like. Furthermore, the upper limit of the washing cycle corresponds to a large scale maintenance that is conducted once a year, and can be suitably determined according to the production amount, the production serial number and the like, every 300 days, every 200 days, or the like.

Therefore, the cycle of washing in the present invention may be determined by the above-mentioned cycle in advance, and preferably, it is preferable to confirm the physical properties of the obtained water absorbent resin and determine the cycle of washing depending on the decrease or change in the physical properties. In this case, the physical properties of the water absorbent resin to be confirmed include the physical properties mentioned below, and especially include a water absorption capacity under load (for example, AAP), liquid permeability (for example, SFC and GBP), particle size distribution (especially the amount of the fine powder, a substance that has passed a JIS standard sieve with an opening of 150 μm) and the like. Specifically, the cycle of washing is determined depending on the decrease or change in the particle size distribution and the liquid permeability. In other words, the cycle of washing in the classification step is determined by the change in the particle size and the change in the liquid permeability after the classification step.

(E) Classification Apparatus after Washing

In the present invention, it is preferable that the classification apparatus after the washing is used after removing the water, especially after drying. The method for removing the water is not especially limited, and the water may be wiped away by a water absorbent material such as a cloth, or the classification apparatus may be subjected to natural drying by being left at room temperature (20 to 25° C.) or under sunlight, and preferably, the water may be removed by using a hot air drier or an airflow (for example, a high pressure gas).

(F) Prior Art

The above-mentioned Patent Literatures 24 to 32 each describe an improved technology in a classification step as a method for improving the liquid permeability of a water absorbent resin, but either of these documents does not disclose washing (water washing) of a sieve net and attachments thereof (for example, tapping balls).

On the other hand, the following Patent Literatures 33 to 35 each disclose washing of pipes so as to prevent occlusion by the polymerization of monomers in transfer pipes or the like, and Patent Literature 36 discloses washing of a polymerization belt. Furthermore, Patent Literature 37 discloses washing of a polymerization belt and a meat chopper, Patent Literature 38 discloses a method for washing out an water absorbent resin adhered to an inner wall surface of a polymerization apparatus, a surface of a stirrer, inner wall surfaces of transfer pipes, or the like in reverse-phase suspension polymerization by a high pressure water flow, Patent Literature 39 discloses a method of removing an adhered polymer including treating an adhered substance of a water-soluble polymer and/or a water-swellable polymer with an inorganic salt aqueous solution and/or an alkaline aqueous solution, and Patent Literature 40 discloses washing of a nozzle for injecting a surface crosslinking agent solution, respectively.

(Patent Literature 33) JP 2006-160846 A
(Patent Literature 34) U.S. Pat. No. 6,667,372
(Patent Literature 35) JP 2010-515815 W
(Patent Literature 36) WO 2009/001954 pamphlet
(Patent Literature 37) EP 2066737 A
(Patent Literature 38) JP 6-328044 A
(Patent Literature 39) JP 1-242602 A
(Patent Literature 40) US 2011/0098416 A As mentioned above, the above-mentioned Patent Literatures 33 to 40 disclose monomers, a hydrogel or a surface crosslinking agent, and washing of a polymerization apparatus and the like, but do not disclose production apparatuses after a drying step, especially after a pulverizing step, and washing of the apparatus, especially washing in a classification step.

Conventionally, since dried water absorbent resins dislike water, they have been handled under atmospheres of low humidity, and removal by aspiration by vacuum has been generally and frequently used for washing (removal of adhered substance). However, the present invention is preferable since it can conduct washing of the production apparatus, especially washing (washing with water) in the classification step for the production apparatus after the drying step, especially after the pulverizing step. By this washing with water, the liquid permeability of the water absorbent resin is improved.

The monomers, hydrogels or surface crosslinking agents, and the washing of the polymerization apparatus and the like disclosed in the above-mentioned Patent Literatures 33 to 40 can also be applied to the present invention.

(2-6) Fine Powder Collection Step

This step is a step of recycling the fine particles that have been generated in the above-mentioned classification step (the second classification step after the surface cross-linking step mentioned below is included. The same will apply to the following in this item.) to the step before the drying step. Specifically, the step refers to a step in which the fine particles that have passed through the sieve net having an opening of 45 to 250 µm (for example, a standard sieve of 150 µm or the like) in the above-mentioned classification step is separated and collected, and the fine particles or a water-added product thereof is utilized again in the step before the drying step.

More specifically, the step refers to a step in which fine particles that have been generated in the classification step or sometimes in the drying step or pulverizing step (especially refers to fine particles containing 70% by weight or more of a water absorbent resin having a particle diameter of lower than 150 µm) are separated, and the fine particles are added in the intact state, or hydrated or granulated and then added, to the step before the drying step, preferably the polymerization step, the gel-crushing step or the drying step.

The above-mentioned fine particles may be either the fine particles that are generated in the classification step before the surface cross-linking step mentioned below, or the fine particles that are generated in the second classification step after the surface cross-linking step. Furthermore, the added amount of the fine particles, i.e., the separation collection amount of the fine particles is preferably from 1 to 40% by weight, more preferably from 5 to 30% by weight relative to the entirety of the water absorbent resin to which the fine particles are collected. Furthermore, when the above-mentioned fine particles are added in the intact state, or hydrated or granulated and then added, to the monomer aqueous solution before the polymerization and/or the hydrogel during the polymerization, inorganic fine particles or the like can also be mixed as necessary.

As the step for collecting a fine powder, a method of collecting a fine powder into a monomer aqueous solution before polymerization is disclosed in WO 92/001008 A, WO 92/020723 A and the like, a method of collecting a fine powder into hydrogel during polymerization is disclosed in WO 2007/074167 A, WO 2009/109563 A, WO 2009/153196 A and WO 2010/006937 A, a method of collecting in a drying step (drier) is disclosed in U.S. Pat. No. 6,228,930 and the like, respectively, and these fine powder collection methods are preferably applied in the present invention.

In the fine powder collection step, the particle size of the water absorbent resin can be controlled by removing the fine particles from the water absorbent resin, and since airspaces are generated among the particles of the water absorbent resin, the liquid permeability (for example, SFC) is improved. Furthermore, since the surface area is increased by granulating the fine particles and then adding to the water absorbent resin, the water absorbent speed (for example, FSR) is improved. In addition, since the fine powder is collected into the monomer aqueous solution during the polymerization, the viscosity of the monomer aqueous solution increases and foaming polymerization is promoted, i.e., a water absorbent resin having a large surface area can be consequently obtained, and thus an effect that a water absorbent resin having a high water absorbent speed can be obtained is achieved.

(2-7) Surface Cross-Linking Step

This step is a step of further providing a part having a high cross-linking density to the surface layer (a part at several ten micrometers from the surface of the water absorbent resin powder) of the water absorbent resin powder obtained through the above-mentioned steps, and is constituted by a mixing step in which the water absorbent resin powder and a surface crosslinking agent solution are mixed, a heat treatment step in which the mixture is subjected to a heat treatment, and a cooling step in which the mixture is cooled as necessary.

As the surface cross-linking method, radical cross-linking on the surface of the water absorbent resin powder by a persulfate salt, a light polymerization initiator or the like, polymerization cross-linking in which polymerization is conducted by adding a monomer, a coating cross-linking in which the water-soluble polymer and a crosslinking agent are added, and the like are exemplified, and a covalent-bondable surface crosslinking agent or an ion-bondable surface crosslinking agent, which reacts with the carboxyl groups of a polyacrylic acid, or combination use thereof is preferably applied in the present invention. By these methods, a surface-cross-linking water absorbent resin (water absorbent resin particles) can be obtained. The surface cross-linking step is an optional step, and can be suitably selected depending on the physical properties of the desired water absorbent resin.

(Covalent-Bondable Surface Crosslinking Agent)

As the covalent-bondable surface crosslinking agent (organic surface crosslinking agent) that can be used in the present invention, as mentioned above, a surface crosslinking agent that can react with carboxyl groups is preferably applied from the viewpoints of the physical properties of the obtained water absorbent resin and the handling property of the surface crosslinking agent.

Specific examples include polyvalent alcohol compounds such as mono, di, tri, tetra or propylene glycols, 1,3-propanediol, glycerin, 1,4-butanediol, 1,3-butanediol, 1,5-pentanediol, 1,6-hexanediol, and sorbitol; epoxy compounds such as ethylene glycol diglycidyl ether, and glycidol; polyvalent amine compounds or their condensates with haloepoxy compounds; oxazoline compounds; (mono, di or poly)oxazolidinone compounds; alkylenecarbonate compounds such as ethylene carbonate; oxetane compounds; cyclic urea compounds such as 2-imidazolidinone, and the like. Among these, dehydration-reactive surface crosslinking agents formed of polyvalent alcohol compounds, alkylene carbonate compounds or oxazolidinone compounds, which require a reaction at a high temperature, are preferable, and plural dehydration-reactive surface crosslinking agents are more preferable. In the cases when a dehydration-reactive surface crosslinking agent is not used, compounds disclosed in U.S. Pat. No. 6,228,930, U.S. Pat. No. 6,071,976, U.S. Pat. No. 6,254,990 and the like can be used.

(Ion-Bondable Surface Crosslinking Agent)

In the present invention, instead of or in addition to the above-mentioned covalent-bondable surface crosslinking agent (organic surface crosslinking agent), an ion-bondable surface crosslinking agent (inorganic surface crosslinking agent) can be used to improve the liquid permeability and the like of the water absorbent resin. In the case when the covalent-bondable surface crosslinking agent and the ion-bondable surface crosslinking agent are used in combination, the surface crosslinking agents may be added to the water absorbent resin simultaneously or separately.

The ion-bondable surface crosslinking agent used is not especially limited, and preferable examples include di- or more valent polyvalent metal salts, more preferable examples include tri- or tetra-valent polyvalent metal salts (organic salts or inorganic salts) or hydroxides. Examples of the polyvalent metals include aluminum, zirconium and the like, and specific examples include aluminum lactate, aluminum sulfate and the like. Surface cross-linking by a polyvalent metal is disclosed in WO 2007/121037 A, WO 2008/09843 A and WO 2008/09842 A, U.S. Pat. No. 7,157,141, U.S. Pat. No. 6,605,673 and U.S. Pat. No. 6,620,889, US 2005/0288182 A, US 2005/0070671 A, US 2007/0106013 A and US 2006/0073969 A, and the like.

Furthermore, the liquid permeability and the like of the obtained water absorbent resin can also be improved by using a polyamine polymer, especially a polyamine polymer having a weight average molecular weight of about 5,000 to 1,000,000 simultaneously or separately with the above-mentioned covalent-bondable surface crosslinking agent. In this case, examples of the polyamine polymer used include the polyamine polymers disclosed in U.S. Pat. No. 7,098,284, WO 2006/082188 A, WO 2006/082189 A, WO 2006/082197 A, WO 2006/111402 A, WO 2006/111403 A, WO 2006/111404 A and the like.

(Solvent and the Like)

The used amount of the surface crosslinking agent in the present invention (in the case when plural surface crosslinking agents are used, the total amount thereof) is preferably from 0.001 to 10 parts by weight, more preferably from 0.01 to 5 parts by weight relative to 100 parts by weight of the water absorbent resin powder, depending on the surface crosslinking agent(s) used, the combination thereof, and the like. Furthermore, in the case when the above-mentioned covalent-bondable surface crosslinking agent (organic surface crosslinking agent) and the ion-bondable surface crosslinking agent (inorganic surface crosslinking agent) are used in combination, the used amount of each crosslinking agent is preferably from 0.001 to 10 parts by weight, more preferably from 0.01 to 5 parts by weight relative to 100 parts by weight of the water absorbent resin powder.

Furthermore, water may be preferably used in combination with the surface crosslinking agent. In this case, the used amount of the water is preferably from 0.5 to 20 parts by weight, more preferably from 0.5 to 10 parts by weight relative to 100 parts by weight of the water absorbent resin powder.

Furthermore, a hydrophilic organic solvent can also be used, and the used amount thereof is preferably from 0 to 10 parts by weight, more preferably from 0 to 5 parts by weight relative to 100 parts by weight of the water absorbent resin powder. Furthermore, in the addition and mixing of the surface crosslinking agent solution in the water absorbent resin powder, a water-insoluble fine particle powder body and a surfactant may be present together within the scope in which the effect of the present invention is not interrupted. The used amount in this case is preferably from 0 to 10 parts by weight, more preferably from 0 to 5 parts by weight, still more preferably from 0 to 1 part by weight relative to 100 parts by weight of the water absorbent resin powder. Specific surfactants and the like are disclosed in U.S. Pat. No. 7,473,739 and the like.

(Mixing Step)

The method for addition and mixing of the surface crosslinking agent in the surface cross-linking step of the present invention is not especially limited, and it is preferable to prepare water, a hydrophilic organic solvent or a mixture thereof as a solvent in advance, and add the solvent to the water absorbent resin powder by spraying or dropwise addition and mix the mixture, and spraying and mixing are preferable.

The mixing apparatus used for the mixing of the surface crosslinking agent and the water absorbent resin powder is not especially limited, and a high-speed stirring type mixing apparatus is preferable, a high-speed stirring type continuous mixing apparatus is more preferable, and a horizontal or longitudinal type high-speed stirring type continuous mixing apparatus is still more preferable. More specific examples include a Turbulizer (manufactured by Hosokawa Micron Corporation) and a Lödige mixer (manufactured by Lödige) and the like.

As the mixing condition, the rotation speed is preferably from 100 to 10,000 rpm, and more preferably from 300 to 2,000 rpm. Furthermore, the retention time is preferably within 180 seconds, more preferably from 0.1 to 60 seconds, still more preferably from 1 to 30 seconds.

(Heat Treatment Step)

The water absorbent resin powder in which the surface crosslinking agent has been added and mixed in the above-mentioned mixing apparatus is subjected to a heat treatment. The heat treatment apparatus at this time is not especially limited, and a horizontal continuous stirring apparatus is preferable, and a specific example is a paddle drier. The temperature during the above-mentioned heat treatment (heating temperature) is preferably from 70 to 300° C., more preferably from 120 to 250° C., still more preferably from 150 to 250° C. Furthermore, the heating time is preferably from 1 minute to 2 hours.

(Cooling Step)

In the present invention, the cooling step is an optional step, and is conducted after the above-mentioned heat treatment step as necessary. The cooling apparatus in this step is not especially limited, and a horizontal continuous stirring apparatus having the same specification as that in the heat treatment step is preferable, and a specific example is a paddle drier. The temperature in the above-mentioned cooling temperature (cooling temperature) is preferably 100° C. or less, more preferably from 30 to 95° C., and still more preferably from 40 to 90° C.

In the present invention, the temperature of the water absorbent resin powder body (particulate water absorbing agent) that is fed to the surface cross-linking step and the transfer tube is preferably 30° C. or more, more preferably 40° C. or more, still more preferably 50° C. or more. By keeping the temperature of the water absorbent resin powder body (particulate water absorbing agent) that is fed to the transfer tube at a predetermined temperature or more, decrease of the physical properties of the particulate water absorbing agent is suppressed. Specifically, it is significantly effective for maintaining the physical properties such as saline flow conductivity (SFC).

(2-8) Other Steps

Besides the above-mentioned steps, a step of recycling an evaporated monomer, a granulation step, a step of recycling a fine powder and the like may be provided as necessary, and in the case when a surface cross-linking step is provided, a second classification step can be provided after the surface cross-linking.

Furthermore, for a color hue stability effect over time, an effect of preventing gel deterioration and the like, a step of adding an oxidant, a chelating agent, an antioxidant, water, a polyvalent metal compound, a water-insoluble inorganic or organic powders such as silica or metal soap, an odor eliminating agent, an antibacterial agent, a polymer polyamine, pulp or thermoplastic fibers or the like by preferably from 0 to 3 parts by weight, more preferably from 0 to 1 part by weight relative to 100 parts by weight of the water absorbent resin may also be provided.

It is preferable that continuous production is conducted over a long time in the method for producing a water absorbent resin according to the present invention. Specifically, the production method of the present invention can be applied to continuous production for generally 24 hours or more, preferably 10 days or more, more preferably 30 days or more, still more preferably 50 days or more, particularly preferably 100 days or more. By conducting such continuous production for a long time period, variation of the physical properties of the water absorbent resin at the initiation and abeyance of the production is decreased, and thus the production can be conducted efficiently. The upper limit of the continuous production period is not especially limited, but it is preferably about one year or less from the viewpoint of the maintenance of the apparatus.

[3] Physical Properties of Polyacrylic Acid (Salt)-Based Water Absorbent Resin

The polyacrylic acid (salt)-based water absorbent resin obtained in production method according to the present invention preferably has a saline flow conductivity (SFC) of 20 ($\times 10^{-7} \cdot s \cdot cm^3 \cdot g^{-1}$) or more, and in the cases when the water absorbent resin is used in hygiene products, especially in disposable diapers, it is desired to control at least one or more, preferably two or more, more preferably three or more physical properties including the saline flow conductivity (SFC) from the following (a) to (d) to be within desired ranges besides the above-mentioned physical properties. In the case when these physical properties do not satisfy the following ranges, the effect of the present invention cannot be sufficiently obtained, and sufficient performances are not exerted in high concentration disposable diapers, and further, the effect of use of the production method of the present invention may be decreased.

The present invention is preferably applied to a method for producing a water absorbent resin containing a water absorbent resin or fine particles in a small amount, which has high liquid permeability (SFC). In other words, the production method of the present invention is preferably a production method in which the obtained water absorbent resin has a liquid permeability (SFC) of 20 ($\times 10^{-7} \cdot s \cdot cm^3 \cdot g^{-1}$) or more, and is more preferably a method for producing a water absorbent resin having a SFC value in the following range. Furthermore, it is preferably a production method in which the amount of the fine particles of the obtained water absorbent resin (a product that has passed a sieve having an opening of 150 μm) is 1% by weight or less, and is more preferably a method for producing a water absorbent resin having a particle size in the following range.

(a) CRC (Water Absorption Capacity Without Load)

The CRC (water absorption capacity without load) of the water absorbent resin of the present invention is preferably 10 (g/g) or more, more preferably 20 (g/g) or more, still more preferably 25 (g/g) or more, and particularly preferably 30 (g/g) or more. The upper limit value is not especially limited, and is preferably 50 (g/g) or less, more preferably 45 (g/g) or less, and still more preferably 40 (g/g) or less in view of the balance with other physical properties.

(b) AAP (Absorption Against Pressure)

The AAP (absorption against pressure) of the water absorbent resin of the present invention is preferably 20 (g/g) or more, more preferably 22 (g/g) or more, and still more preferably 24 (g/g) or more. The upper limit value is not especially limited, but is preferably 35 (g/g) or less. One of the means for achieving the AAP (absorption against pressure) for preventing leakage in disposable diapers is the above-mentioned polymerization.

(c) SFC (Saline Flow Conductivity)

The SFC (saline flow conductivity) of the water absorbent resin of the present invention is preferably 20 ($\times 10^{-7} \cdot s \cdot cm^3 \cdot g^{-1}$) or more, more preferably 50 ($\times 10^{-7} \cdot s \cdot cm^3 \cdot g^{-1}$) or more, still more preferably 70 ($\times 10^{-7} \cdot s \cdot cm^3 \cdot g^{-1}$) or more, and particularly preferably 100 ($\times 10^{-7} \cdot s \cdot cm^3 \cdot g^{-1}$) or more. One of the means for achieving the SFC (saline flow conductivity) for preventing leakage in disposable diapers is the above-mentioned polymerization or surface cross-linking.

(d) Moisture Content

The moisture content of the water absorbent resin of the present invention is preferably more than 0% by weight and 15% by weight or less, more preferably from 1 to 13% by weight, still more preferably from 2 to 10% by weight, and particularly preferably from 2 to 9% by weight. By controlling the above-mentioned moisture content to be in the above-mentioned range, a water absorbent resin having excellent powder body properties (for example, fluidity, transportation (conveyancing) property, damage resistance and the like) can be obtained.

(e) Particle Size

The particle size (weight average particle diameter (D50), the amount of the fine particles having a particle diameter of lower than 150 μm, the amount of the coarse particles having a particle diameter of more than 850 μm and the logarithm standard deviation (σζ) of the particle size distribution) of the water absorbent resin of the present invention is controlled to be the similar to that of the water absorbent resin powder before the surface cross-linking.

[4] Applications of Polyacrylic Acid (Salt)-Based Water Absorbent Resin

The applications of the water absorbent resin of the present invention are not especially limited, and the water absorbent resin can be preferably used in absorbent body for hygiene products such as disposable diapers, sanitary napkins and incontinence pads. The water absorbent resin can be especially used as an absorbent body for high concentration disposable diapers (disposable diapers in which the use amount of a water absorbent resin per one disposable diaper is much), for which there have been problems of odor and coloring derived from raw materials, and the like. Furthermore, a significant effect can be expected in the case when the water absorbent resin is used in an upper layer part of the above-mentioned absorbent body.

Furthermore, absorbable materials such as pulp fibers can be used as the above-mentioned absorbent body besides the water absorbent resin. In this case, the content (core concentration) of the water absorbent resin in the absorbent body is preferably from 30 to 100% by weight, more preferably from 40 to 100% by weight, still more preferably from 50 to 100% by weight, further still more preferably from 60 to 100% by weight, particularly preferably from 70 to 100% by weight, and most preferably from 75 to 95% by weight.

By setting the above-mentioned core concentration to be in the above-mentioned range, in the case when the absorbent body is used in the upper layer part of the absorbent article, the absorbent article can retain a white state with cleanness. Furthermore, since the absorbent body is excellent in property of diffusing a body fluid such as urine or blood, improvement of an absorption amount can be expected by efficient liquid distribution.

EXAMPLES

The present invention will be explained in more detail according to the following Examples, but the present invention is not construed to be limited to these Examples, and examples obtained by suitably combining the technical means disclosed in the respective Examples are also included in the scope of the present invention.

In these Examples, "liter" is represented as "l" or "L", and "% by weight" is represented as "wt %" in some cases for convenience. Furthermore, in the measurement of a trace amount component, the detection limit or less is represented by N. D (Not Detected).

As the electrical apparatus (the measurement of the physical properties of the water absorbent resin is also included) used in Preparation Examples, Examples and Comparative Examples, a power source of 200 V or 100 V was used unless otherwise specified. Furthermore, the respective physical properties of the water absorbent resin of the present invention were measured under conditions of room temperature (20 to 25° C.) and a relative humidity of 50% RH unless otherwise specified.

[Measurement of Physical Properties of Water Absorbent Resin]

(a) CRC (Water Absorption Capacity Without Load)

The CRC (water absorption capacity without load) of the water absorbent resin of the present invention was measured according to the EDANA method (ERT441.2-02).

(b) AAP (Absorption Against Pressure)

The AAP (absorption against pressure) of the water absorbent resin of the present invention was measured according to the EDANA method (ERT442.2-02). The measurement is sometimes conducted by changing the load condition to 4.83 kPa (0.7 psi). Such case is described as AAP 0.7. Furthermore, the case when the load condition is 2.07 kPa (0.3 psi) in the EDANA method is described as AAP 0.3.

(c) SFC (Saline Flow Conductivity)

The SFC (saline flow conductivity) of the water absorbent resin of the present invention was measured according to the measurement method disclosed in U.S. Pat. No. 5,669,894.

(d) Water Content Percentage

The moisture content of the water absorbent resin of the present invention was measured according to the EDANA method (ERT430.2-02). In the present invention, the measurement was conducted by changing the drying temperature to 180° C.

(e) Particle Size

The particle size (weight average particle diameter (D50), the amount of the fine particles having a particle diameter of lower than 150 μm or 180 μm, the amount of the coarse particles having a particle diameter of more than 850 μm and the logarithm standard deviation (σζ) of the particle size distribution) of the water absorbent resin of the present invention was measured according to the measurement method disclosed in U.S. Patent Application Publication No. 2006/204755. The amount of the fine particles and the amount of the coarse particles were determined according to the opening of the JIS standard sieve used.

[Measurement Trajectory (R, T, E) of Rocking-Type Sieve]

As shown in FIG. 1, paper for trajectory recording 17 was attached to the side surface of a rocking-type sieve classification apparatus 10. Next, a dedicated ballpoint pen 18 with a ring was installed in a dedicated platform. Since the rocking-type sieve classification apparatus 10 moves in a three-dimensional manner, the dedicated ballpoint pen 18 has a special structure that expands and contracts so that the tip of the pen does not go away from the paper for trajectory recording. The paper for trajectory recording 17 can be attached to an optional position of the rocking-type sieve classification apparatus 10, and a similar trajectory can be obtained even when the measurement is conducted on either position in the case when the shaking condition is the same.

Subsequently, a horizontal reference line was drawn by moving the rocking-type sieve classification apparatus 10 from side to side by hand, the classification apparatus is then operated, and the trajectory was depicted on a recording paper. The result is shown in FIG. 2.

The lengths of the respective portions shown in FIG. 2 correspond to radial gradient R, tangential gradient T and eccentric gradient E.

Example 1

A particulate water absorbing agent was produced by using an apparatus constituted by a polymerization step, a gel-crushing step, a drying step, a pulverizing step, a classification step (a first classification step), a surface crosslinking step (a step of mixing a surface crosslinking agent, a heat treatment step, a cooling step), a sizing step (a second classification step) and transport steps that connect the respective steps as an apparatus for continuous production of a water absorbent resin having an apparatus production capacity of 3,500 (kg/hr). Each of the steps may be a single line or two or more lines (branched in parallel), and in the case of two or more lines, the total amount of the whole lines was described. The continuous production apparatus was operated under the operation conditions for the respective steps mentioned below, whereby the continuous production of water absorbent resin (1) was initiated.

(Polymerization Step)

Firstly, 193.3 parts by weight of acrylic acid, 64.4 parts by weight of a 48% by weight of sodium hydroxide aqueous solution, 1.26 parts by weight of polyethylene glycol diacrylate (average n=9), 52 parts by weight of a 0.1% by weight of ethylenediamine tetra(methylenephosphonic acid) 5 sodium aqueous solution, and 134 parts by weight of deionized water were mixed to prepare monomer aqueous solution (1'), and the liquid temperature was adjusted to 40° C.

The above-mentioned monomer aqueous solution (1') was then continuously fed to the polymerization apparatus by using a quantification pump. At that time, 97.1 parts by weight of a 48% by weight of sodium hydroxide aqueous solution was further fed, and the mixture was continuously mixed by line mixing. The liquid temperature at this time became 85° C. by the heat of neutralization. Thereafter, 8.05 parts by weight of a 4% by weight of persulfate sodium aqueous solution was further fed, and the mixture was continuously mixed by line mixing to give monomer aqueous solution (1).

The monomer aqueous solution (1) obtained in the above-mentioned operation was continuously fed onto a plane steel belt (polymerization apparatus) having weirs on both ends so that the thickness became about 7.5 mm, and static aqueous solution polymerization was conducted. The polymerization time in this polymerization was 3 minutes. By this operation, a band-like water-containing gel-like crosslinked polymer (hydrogel) (1) was obtained.

(Gel-Crushing Step)

Subsequently, the band-like hydrogel (1) obtained in the above-mentioned polymerization step was cut at equal intervals in the direction vertical to the progress direction of the belt, and the gel was fed into a meat chopper having a pore size of 22 mm and subjected to gel-crushing to form particles of about 1.5 mm, whereby particulate hydrogel (1) was obtained.

(Drying Step)

Subsequently, the above-mentioned particulate hydrogel (1) was put onto a transferring porous plate of a continuous through-flow belt type drier and spreaded thereon so that the thickness became 50 mm, and dried at 185° C. for 30 minutes. Block-like dried polymer (1) was obtained at the outlet of the drier. The total output amount of the dried polymer (1) was 246 parts by weight.

(Pulverizing Step)

Subsequently, the whole amount of the above-mentioned dried polymer (1) (about 60° C.) was continuously fed to a three-stage roll mill (roll gaps; 0.83 mm/0.45 mm/0.24 mm from the top) to pulverize the polymer, whereby pulverized polymer (1) was obtained. The reduced pressure degree in the pulverizing step was adjusted to 0.29 kPa. Furthermore, the particle size of the obtained pulverized polymer (1) was such that the weight average particle diameter (D50); 330 µm, the ratio of the particles of 850 µm or more (coarse particles); 1% by weight, the ratio of the particles of 150 µm or more and lower than 850 µm; 86% by weight, and the ratio of the particles of lower than 150 µm (fine particles); 13% by weight.

(Classification Step (First Classification Step))

Subsequently, the whole amount of the above-mentioned pulverized polymer (1) (powder temperature; about 60° C.) was classified by continuously feeding the pulverized polymer to a rocking-type circular sieve classification apparatus (a sieve apparatus having three metal sieve nets in total having openings of 850 µm/180 µm/180 µm in this order from the top (a surface area per one net; 2.65 m$^2$)) (see FIG. 1), whereby water absorbent resin powder (1) was obtained. Specifically, using this classification apparatus, the above-mentioned pulverized polymer (1) was continuously classified into particles (A) remaining on the metal sieve net having an opening of 850 µm, particles (C1) that pass through the second metal sieve net from the top having an opening of 180 µm, particles (B) remaining on the third metal sieve net from the top having an opening of 180 µm, and particles (C2) that pass through all of the metal sieve nets, whereby the above-mentioned particles (B) was obtained as water absorbent resin powder (1). The above-mentioned particles (A) were fed again to the pulverizing step and pulverized.

The classification apparatus was operated at radial gradient R: 8 mm, tangential gradient T: 13 mm, eccentric gradient E: 67 mm, rotation speed F: 230 rpm, and temperature of the apparatus: 55° C. Furthermore, the reduced pressure degree in the classification step was set to 0.11 kPa, and drying air (temperature 75° C., dew point 10° C.) was passed through the classification apparatus at 2 (m$^3$/hr). The stand on which the classification apparatus was installed was connected to a ground point (removal of electricity) at a ground resistance value of 5Ω.

The water absorbent resin powder (1) obtained in the above-mentioned series of operations had such a particle size that the weight average particle diameter (D50); 364 µm, the ratio of the particles of 850 µm or more (coarse particles); 0% by weight, the ratio of the particles of 180 µm or more and lower than 850 µm; 99.7% by weight, and the ratio of the particles of lower than 180 µm (fine particles); 0.3% by weight.

(Surface Cross-Linking Step)

Subsequently, the above-mentioned water absorbent resin powder (1) was continuously fed to a high-speed mixer (Turbulizer/1,000 rpm) at 1,500 (kg/hr), a surface crosslinking agent solution (this contains a covalent-bondable surface crosslinking agent) composed of 0.3 parts by weight of 1,4-butanediol, 0.6 parts by weight of propylene glycol and 3.0 parts by weight of deionized water was sprayed by a spray onto 100 parts by weight of the water absorbent resin powder (1), and the water absorbent resin powder was mixed homogeneously (mixing step). The obtained mixture was then transferred to a paddle drier and heat-treated at 208° C. for 40 minutes (heat treatment step).

Subsequently, forced cooling was conducted until the mixture became 60° C. by using a paddle drier having a similar specification to that in the heat treatment step (cooling step). In this cooling step, a mixed liquid (ion-bondable surface crosslinking agent solution) composed of 1.17 parts by weight of a 27.5% by weight of aluminum sulfate aqueous solution (8% by weight in terms of aluminum oxide), 0.196 parts by weight of a 60% by weight of sodium lactate aqueous solution and 0.029 parts by weight of propylene glycol was sprayed by a spray onto 100 parts by weight of the water absorbent resin powder (1), and the water absorbent resin powder was homogeneously mixed to give water absorbent resin particles (1).

(Sizing Step (Second Classification Step))

Subsequently, the above-mentioned water absorbent resin particles (1) were crushed until the whole amount thereof passed through a JIS standard sieve having an opening of 710 μm. The "crush" described left refers to an operation for loosening the water absorbent resin particles that has flocculated during the surface cross-linking until the particles pass through a sieve net having an opening of 710 μm. By the above-mentioned operation, surface cross-linked water absorbent resin (1) was obtained. The particle size of the water absorbent resin powder (1) after the first classification step and the fine powder amount and the physical properties of the water absorbent resin (1) are shown in Table 1.

Example 2

Water absorbent resin (2) was obtained by conducting similar operations to those in Example 1, except that the openings of the metal sieve nets were changed to three metal sieve nets in total having openings of 850 μm/150 μm/150 μm in this order from the top (the surface area per one metal sieve net; 2.65 m$^2$) in the rocking-type circular sieve classification apparatus (first classification step) of Example 1. The particle size of the water absorbent resin powder (2) after the first classification step and the fine powder amount and the physical properties of water absorbent resin (2) are shown in Table 1.

Example 3

Water absorbent resin (3) was obtained by conducting similar operations to those in Example 2, except that the tangential gradient T in the rocking-type circular sieve classification apparatus (first classification step) was changed to 3 mm in Example 2. The particle size of the water absorbent resin powder (3) after the first classification step and the fine powder amount and the physical properties of water absorbent resin (3) are shown in Table 1.

Example 4

Water absorbent resin (4) was obtained by conducting similar operations to those in Example 2, except that the radial gradient R in the rocking-type circular sieve classification apparatus (first classification step) was changed to 16 mm in Example 2. The particle size of the water absorbent resin powder (4) after the first classification step and the fine powder amount and the physical properties of water absorbent resin (4) are shown in Table 1.

Example 5

Water absorbent resin (5) was obtained by conducting similar operations to those in Example 1, except that the classification was conducted by a classification apparatus having a metal sieve net having a surface area of 5.3 m$^2$ and an opening of 850 μm in the first classification step of Example 1, and using the rocking-type circular sieve classification apparatus used in Example 1 (however, the metal sieve net having an opening 850 μm was removed, and only two metal sieve nets in total having openings of 180 μm/180 μm (the surface area per one metal sieve net; 2.65 m$^2$) were disposed). The particle size of the water absorbent resin powder (5) after the first classification step and the fine powder amount and the physical properties of water absorbent resin (5) are shown in Table 1.

Example 6

Water absorbent resin (6) was obtained by conducting similar operations to those in Example 1, except that the radial gradient R of the rocking-type circular sieve classification apparatus (first classification step) was changed to 23 mm in Example 1. The particle size of the water absorbent resin powder (6) after the first classification step and the fine powder amount and the physical properties of water absorbent resin (6) are shown in Table 1.

Example 7

Water absorbent resin (7) was obtained by conducting similar operations to those in Example 1, except that the tangential gradient T in the rocking-type circular sieve classification apparatus (first classification step) was changed to 21 mm in Example 1. The particle size of the water absorbent resin powder (7) after the first classification step and the fine powder amount and the physical properties of water absorbent resin (7) are shown in Table 1.

Comparative Example 1

Comparative water absorbent resin (1) was obtained by conducting similar operations to those in Example 1, except that the radial gradient R of the rocking-type circular sieve classification apparatus (first classification step) was changed to 2 mm in Example 1. The particle size of the comparative water absorbent resin powder (1) after the first classification step and the fine powder amount and the physical properties of comparative water absorbent resin (1) are shown in Table 1.

Comparative Example 2

Comparative water absorbent resin (2) was obtained by conducting similar operations to those in Example 2, except that the tangential gradient T of the rocking-type circular sieve classification apparatus (first classification step) was changed to 30 mm in Example 2. The particle size of the comparative water absorbent resin powder (2) after the first classification step and the fine powder amount and the physical properties of comparative water absorbent resin (2) are shown in Table 1.

Example 8

Water absorbent resin (8) was obtained by conducting similar operations to those in Example 1, except that the rocking-type circular sieve classification apparatus (first classification step) used in Example 1 was changed to a rocking-type circular sieve classification apparatus having two metal sieve nets in total having openings of 850 μm/180 μm in this order from the top (the surface area per one metal sieve net; 5.3 m$^2$). The particle size of the water absorbent resin powder (8) after the first classification step and the fine powder amount and the physical properties of water absorbent resin (8) are shown in Table 1.

Example 9

Water absorbent resin (9) was obtained by conducting similar operations to those in Example 2, except that the rocking-type circular sieve classification apparatus (first classification step) used in Example 2 was changed to a rocking-type circular sieve classification apparatus having two metal sieve nets in total having openings of 850 μm/150 μm in this order from the top (the surface area per one metal sieve net; 5.3 m$^2$). The particle size of the water absorbent resin powder (9) after the first classification step and the fine powder amount and the physical properties of water absorbent resin (9) are shown in Table 1.

Comparative Example 3

Comparative water absorbent resin (3) was obtained by conducting similar operations to those in Example 8, except that the radial gradient R of the rocking-type circular sieve classification apparatus (first classification step) was changed to 2 mm in Example 8. The particle size of the comparative water absorbent resin powder (3) after the first classification step and the fine powder amount and the physical properties of comparative water absorbent resin (3) are shown in Table 1.

Comparative Example 4

Comparative water absorbent resin (4) was obtained by conducting similar operations to those in Example 9, except that the tangential gradient T of the rocking-type circular sieve classification apparatus (first classification step) was changed to 30 mm in Example 9. The particle size of the comparative water absorbent resin powder (4) after the first classification step and the fine powder amount and the physical properties of comparative water absorbent resin (4) are shown in Table 1.

Comparative Example 5

Comparative water absorbent resin (5) was obtained by conducting similar operations to those in Example 2, except that the eccentric gradient E of the rocking-type circular sieve classification apparatus (first classification step) was changed to 30 mm in Example 2. The particle size of the comparative water absorbent resin powder (5) after the first classification step and the fine powder amount and the physical properties of comparative water absorbent resin (5) are shown in Table 1.

Comparative Example 6

Comparative water absorbent resin (6) was obtained by conducting similar operations to those in Example 9, except that the eccentric gradient E of the rocking-type circular sieve classification apparatus (first classification step) was changed to 30 mm in Example 9. The particle size of the comparative water absorbent resin powder (6) after the first classification step and the fine powder amount and the physical properties of comparative water absorbent resin (6) are shown in Table 1.

TABLE 1

| | Classification sieve net Upper column: opening [μm] Lower column: surface area [m$^2$] | | | Trajectory | | | | Water absorbent resin powder | | |
|---|---|---|---|---|---|---|---|---|---|---|
| | | | | R [mm] | T [mm] | E [mm] | F [rpm] | D50 [μm] | Amount of micropowder [wt %] | Water absorbent resin SFC [(1)] |
| Example 1 | 850 / 2.65 | 180 / 2.65 | 180 / 2.65 | 8 | 13 | 67 | 230 | 364 | 0.3 | 50 |
| Example 2 | 850 / 2.65 | 150 / 2.65 | 150 / 2.65 | 8 | 13 | 67 | 230 | 366 | 0.6 | 48 |
| Example 3 | 850 / 2.65 | 150 / 2.65 | 150 / 2.65 | 8 | 3 | 67 | 230 | 360 | 0.7 | 47 |
| Example 4 | 850 / 2.65 | 150 / 2.65 | 150 / 2.65 | 16 | 13 | 67 | 230 | 360 | 0.7 | 47 |
| Example 5 | 850 / 5.3 | 180 / 2.65 | 180 / 2.65 | 8 | 13 | 67 | 230 | 365 | 0.3 | 50 |
| Example 6 | 850 / 2.65 | 180 / 2.65 | 180 / 2.65 | 23 | 13 | 67 | 230 | 358 | 0.8 | 45 |
| Example 7 | 850 / 2.65 | 180 / 2.65 | 180 / 2.65 | 8 | 21 | 67 | 230 | 356 | 0.9 | 45 |
| Comparative Example 1 | 850 / 2.65 | 180 / 2.65 | 180 / 2.65 | 2 | 13 | 67 | 230 | 341 | 1.9 | 40 |
| Comparative Example 2 | 850 / 2.65 | 150 / 2.65 | 150 / 2.65 | 8 | 30 | 67 | 230 | 340 | 2.1 | 40 |
| Comparative Example 5 | 850 / 2.65 | 150 / 2.65 | 150 / 2.65 | 8 | 13 | 30 | 230 | 343 | 1.8 | 41 |
| Example 8 | 850 / 5.3 | 180 / 5.3 | | 8 | 13 | 67 | 230 | 350 | 1.1 | 39 |
| Example 9 | 850 / 5.3 | 150 / 5.3 | | 8 | 13 | 67 | 230 | 348 | 1.2 | 38 |
| Comparative Example 3 | 850 / 5.3 | 180 / 5.3 | | 2 | 13 | 67 | 230 | 335 | 2.2 | 35 |
| Comparative Example 4 | 850 / 5.3 | 180 / 5.3 | | 8 | 30 | 67 | 230 | 334 | 2.5 | 33 |
| Comparative Example 6 | 850 / 5.3 | 150 / 5.3 | | 8 | 13 | 30 | 230 | 334 | 2.4 | 33 |

[(1)] Unit of SFC [×10$^{-7}$ · cm$^3$ · s · g$^{-1}$]

(Summary)

The above-mentioned Examples 1 to 7 and Comparative Examples 1 to 2 and 5 are examples of classification in which two metal sieve nets having the same opening (for example, 180 μm or 150 μm) are used in combination, and Examples 8 to 9 and Comparative Examples 3 to 4 and 6 are examples of classification in which metal sieve nets are not used in combination.

As is apparent from the comparison of Example 1 (radial gradient R; 8 mm) and Comparative Example 1 (radial gradient R; 2 mm), it is understood that, when the radial gradient R of the rocking-type circular sieve classification apparatus is increased, the amount of the fine powder in the water absorbent resin powder after the first classification step was decreased (1.9% by weight→0.3% by weight), and the liquid permeability (SFC) of the water absorbent resin is improved (40→50). The tendency is similarly confirmed when the number of the metal sieve nets is changed (3→2 metal sieve nets/Example 8 and Comparative Example 3).

From the comparison of Example 1 and Example 6 and the comparison of Example 2 and Example 4, a tendency that the amount of the fine powder in the water absorbent resin powder after the first classification step is decreased more and the liquid permeability (SFC) of the water absorbent resin is improved more was confirmed when the radial gradient R was within a more preferable range, from 5 to 15 mm.

As is apparent from the comparison of Example 2 (tangential gradient T; 13 mm) and Comparative Example 2 (tangential gradient T; 30 mm), it is understood that, when the tangential gradient T of the rocking-type circular sieve classification apparatus was decreased, the amount of the fine powder in the water absorbent resin powder after the first classification step is decreased (2.1% by weight→0.6% by weight), and the liquid permeability (SFC) of the water absorbent resin is improved more (40→48). This tendency is similarly confirmed when the number of the metal sieve nets is changed (3→2 metal sieve nets/Example 9 and Comparative Example 4).

In the present invention, a more preferable range of the tangential gradient T is from 4 to 15 mm, and from the comparison of Example 1 and Example 7 and the comparison of Example 2 and Example 3, a tendency that the amount of the fine powder in the water absorbent resin powder after the first classification step is decreased more and the liquid permeability (SFC) of the water absorbent resin is improved more was confirmed when the tangential gradient T was within a more preferable range, from 4 to 15 mm.

As is apparent from the comparison of Example 2 (eccentric gradient E; 13 mm) and Comparative Example 5 (eccentric gradient E; 30 mm), it is understood that, when the eccentric gradient E of the rocking-type circular sieve classification apparatus is increased, the amount of the fine powder in the water absorbent resin powder after the first classification step is decreased (1.8% by weight→0.6% by weight) and the liquid permeability (SFC) of the water absorbent resin is improved (41→48). This tendency is similarly confirmed when the number of the metal sieve nets is changed (3→2 metal sieve nets/Example 9 and Comparative Example 6).

From the comparison of Example 5 (two sieve nets each having an opening of 180 μm were used) and Example 8 (a sieve net having an opening 180 μm was used/the total surface areas were the same), it is understood that the amount of the fine powder in the water absorbent resin powder after the first classification step is decreased (1.1% by weight→0.3% by weight) and the liquid permeability (SFC) of the water absorbent resin is improved (39→50) by installing plural sieve nets having substantially the same opening.

In other words, by setting at least two or more sieve nets used in the rocking-type sieve classification apparatus to have substantially the same opening, a sufficient sieve surface area for obtaining an intended particle size can be ensured without increasing the size of the apparatus. Furthermore, the costs for the equipment can be decreased by the miniaturization of the apparatus. In addition, an effect that the durability of the sieve net is improved by decreasing the diameter of the sieve.

In addition, although it is not described in Table 1, the water absorption capacities without load (CRC) of the water absorbent resins in Examples 1 to 9 and Comparative Examples 1 to 4 were each around 30 (g/g), and the absorptions against pressure (AAP 0.7) were each around 24 (g/g). Namely, the present invention exerts a significant effect by not the water absorption capacity but the liquid permeability (especially SFC) and the amount of the fine powder.

Example 10

Water absorbent resin (1) was continuously produced by operating the continuous production apparatus without stopping in the above-mentioned Example 1.

In order to investigate the changes in the performances of the above-mentioned water absorbent resin (1) over time, sampling was conducted on every 1 ton of the product from the $30^{th}$ day after the initiation of the continuous operation, and the physical properties (SFC/particle size and the like) were measured on 20 tons in total. An average value of the obtained data of the 20 points was obtained, and compared with the water absorbent resin (1) on the first day of the operation (Example 1). The water absorbent resin (1) on the first day of the operation is represented as water absorbent resin (1-1d), and the water absorbent resin (1) on the $30^{th}$ day of the operation is represented as water absorbent resin (1-30d).

The result was such that the SFC of the water absorbent resin (1-1d) was 50 ($\times 10^{-7} \cdot cm^3 \cdot s \cdot g^{-1}$), whereas the SFC of the water absorbent resin (1-30d) was decreased to 42 ($\times 10^{-7} \cdot cm^3 \cdot s \cdot g^{-1}$).

When the cause of the decrease of SFC was pursued, it was proved that the ratio of the particles having a particle diameter of 180 μm or more and lower than 850 μm of the water absorbent resin powder obtained in the classification step was 99.7% by weight on the first day of the operation, whereas the ratio had decreased to 95% by weight on the $30^{th}$ day. In other words, it is presumed that the porosity in the water absorbent resin decreased in accordance with the increase in the amount of the fine powder, and thus the SFC decreased.

Example 11

In order to solve the phenomenon observed in the above-mentioned Example 10 (decrease of SFC), the classification step was temporarily stopped, and the rocking-type circular sieve classification apparatus was washed. The washing was conducted to the extent that any contaminant such as a solid cannot be confirmed by visual observation by adopting vacuum (aspiration) washing using a commercially available aspirator. The steps other than the classification step were not stopped, and the operation was continued under a state in which the operation rate was slightly decreased.

After the above-mentioned vacuum washing, the rocking-type circular sieve classification apparatus was restored, and the operation was restarted. After the restart, the ratio of the particles having a particle diameter of 180 μm or more and lower than 850 μm of the water absorbent resin powder obtained in the classification step was 97% by weight, and the SFC was 44 ($\times 10^{-7} \cdot cm^3 \cdot s \cdot g^{-1}$). Some restoration of the physical properties was observed.

Example 12

In order to solve the phenomenon observed in the above-mentioned Example 10 (decrease of SFC), the classification step was stopped, and the rocking-type circular sieve classification apparatus was washed (water washing with warm water).

The washing (water washing with warm water) was conducted by firstly removing the metal sieve nets from the rocking-type circular sieve classification apparatus, and immersing the metal sieve nets in a warm water bath at 60° C. for 1 hour so that the many pieces of water absorbent resin that entered the openings of the sieves swelled and thus were able to be visually observed.

Subsequently, warm water at 50° C. was sprayed at a outlet pressure (gauge pressure) of 200 (kg/cm$^2$) by using a high pressure washing machine manufactured by Kärcher Japan, whereby the water absorbent resin that was stuck in the openings of the sieves and the contaminant that existed in the dead spaces of the classification apparatus were cleanly removed with no trace.

After the above-mentioned washing (water washing with warm water), when the classification apparatus was dried and restored, and the operation was restarted, the ratio of the particles having a particle diameter of 180 μm or more and lower than 850 μm of the water absorbent resin powder obtained in the classification step was 99.5% by weight and the SFC was 50 [$\times 10^{-7} \cdot cm^3 \cdot s \cdot g^{-1}$], and thus the ratio and SFC were restored to equivalent levels to those in the first day of the operation.

(Summary)

As is understood from Examples 10 to 12, decrease in the physical properties is sometimes observed in a continuous operation for a long period, but such problem is eliminated by conducting washing at every predetermined period, especially water washing with warm water, and thus a water absorbent resin having high physical properties can further be produced stably and continuously.

Example 13

The following operation was conducted according to Example 1 of Patent Literature 26 (WO 2010/032694 A).

Specifically, continuous production was conducted by using an apparatus for continuous production of a water absorbent resin (production capacity; 1,500 [kg/hr]), including a polymerization step (static polymerization on a belt), a gel grain refining (crushing) step, a drying step, a pulverizing step, a classification step (first classification step), a surface cross-linking step (a step of mixing a surface cross-linking agent, a heating step (heat treatment step), a cooling step), a sizing step (second classification step), and transporting steps that connect the respective steps. The above-mentioned first classification step, surface cross-linking step and second classification step were connected by pneumatic transport (dried air having a dew point of 10° C. or heated air at 60° C.)

Specifically, an acrylic acid partial sodium salt aqueous solution of which 75 mol % had been neutralized comprising 0.06 mol % (relative to the monomer) of polyethylene glycol diacrylate (average n number (average polymerization degree) 9) as an internal crosslinking agent (monomer concentration; 37% by weight) was used as monomer aqueous solution (13), and continuous feed was conducted by a quantification pump, and a nitrogen gas was continuously blown into the midstream of the transport tube to set the oxygen concentration to 0.5 [mg/L] or less.

Subsequently, sodium persulfate/L-ascorbic acid, which were 0.14 g/0.005 g, respectively (relative to 1 mol of the monomer), were separately and continuously mixed with the monomer aqueous solution (13) by line mixing, and the mixture was fed to a plane steel belt having weirs on both ends at a thickness of about 30 mm, and static aqueous solution polymerization (continuous belt polymerization) was continuously conducted at 95° C. for 30 minutes (polymerization step).

The water-containing gel-like crosslinked polymer (13) (solid content concentration: 45% by weight) obtained in the above-mentioned polymerization step was segmentalized to about 1 mm by a meat chopper having a pore size of 7 mm under an atmosphere of 60° C. (gel grain refining (crushing) step), and the polymer was then put onto a transferring porous plate of a continuous through-flow belt drier (the dew point of hot air: 30° C.) and spreaded thereon so as to have a thickness of 50 mm and dried at 185° C. for 30 minutes, and the polymer was cooled by being exposed to outer air, whereby dried polymer (13) (solid content: 96% by weight, temperature: 60° C.) was obtained (drying step).

The whole amount of the obtained dried polymer (13) was pulverized by continuously feeding the dried polymer to a three-stage roll mill (the roll gaps were 1.0 mm/0.70 mm/0.50 mm from the top) (pulverizing step).

Subsequently, in a rocking-type circular sieving apparatus formed of a sieve aperture diameter of 1,600 mm having metal sieve nets having openings of 1,000 μm, 850 μm and 150 μm (material: made of SUS304, the surface roughness of the inner surface of sieve Rz: 50 nm, surface roughness Ra: 4.8 nm, tension 50 [N/cm], the surface area of sieve net 2 [m$^2$/sieve net]) (oscillation number: 230 rpm, radial inclination (gradient): 11 mm, tangential inclination (gradient): 11 mm, eccentricity: 35 mm, apparatus temperature: 60° C., atmosphere dew point in apparatus: 13° C.), white (opaque) tapping balls each having a diameter of 30 mm (made of a urethane resin/the ratio of the cross-sectional surface area of the tapping balls relative to the surface area of the metal sieve net: 16%) and a punching metal made of a stainless (material: SUS304) having a pore size of 20 mm (open pore rate 40%) were installed below each of the sieves (openings 1,000 μm, 850 μm and 150 μm). Classification was conducted by using this sieving apparatus, and the particulate content between the metal sieve nets of 850 μm and 150 μm was collected to give water absorbent resin powder (13). The temperature of the water absorbent resin powder after the pulverizing step fed to the sieving apparatus was kept at 60° C. Furthermore, the stand on which the sieving apparatus was installed was connected to a ground point (removal of electricity) at a ground resistance value of 5Ω. In addition, the reduced pressure degree in the sieving apparatus was set to 0.11 kPa by a gas discharging apparatus in which a bag filter is installed, and air having a dew point of 10° C. at a temperature of 60° C. was passed through the inside of the sieving apparatus at 2 [m$^3$/hr] (first classification step).

The water absorbent resin powder (13) obtained above was continuously fed to a high-speed continuous mixer (Turbulizer, 1,000 rpm) at 1,500 [kg/hr] in a quantitative manner, and a surface treatment agent solution composed of a mixed liquid of 0.3 parts by weight of 1,4-butanediol, 0.5 parts by weight of propylene glycol and 2.7 parts by weight of pure water was sprayed by a spray relative to 100 parts by weight of the water absorbent resin powder, and the water absorbent resin powder was mixed. The obtained mixture was then subjected to a heat treatment by a paddle drier at 198° C. for 40 minutes in a continuous manner (surface cross-linking step). The mixture was then forcedly cooled to 60° C. by using a similar paddle drier (cooling step).

Furthermore, in the rocking-type circular sieving apparatus formed of a sieve aperture diameter of 1,600 mm, which was the same as the sieving apparatus used in the above-mentioned first classification step (the temperature of the apparatus: 60° C./only a metal sieve having an opening of 850 μm was used, the atmosphere dew point in the apparatus: 12° C.), white (opaque) tapping balls each having a diameter of 30 mm (made of a urethane resin/the ratio of the cross-sectional surface area of the tapping balls relative to the surface area of the metal sieve net: 16%) and a punching metal made of a stainless (material: SUS304) having a pore size of 20 mm (open pore rate 40%) were installed below the metal sieve (opening 850 μm). The substance that had passed through 850 μm was classified by using this sieving apparatus, and the substance that remained on the sieve net having an opening of 850 μm was pulverized again and then mixed with the substance that had passed through 850 μm, whereby sized water absorbent resin (13) of which the whole amount was the substance that had passed through 850 μm was obtained (sizing step (second classification step)). The temperature of the water absorbent resin powder after the pulverizing step fed to the sieving apparatus was kept at 60° C. Furthermore, the stand on which the sieving apparatus was installed was connected to a ground point (removal of electricity) at a ground resistance value of 5Ω. In addition, the reduced pressure degree in the sieving apparatus was set to 0.11 kPa by a gas discharging apparatus in which a bag filter is installed, and air having a dew point of 10° C. at a temperature of 60° C. was passed through the inside of the sieving apparatus at 2 [m³/hr] (first classification step).

In the above-mentioned first classification step, plural support materials were disposed below the metal sieve net as shown in FIG. 3. When a continuous operation was conducted for one year and the metal sieve net was confirmed, no damage (breakage) was observed on the sieve net.

According to FIG. 3, two support materials (35, 36) are disposed below a circular sieve net (circular sieve) 30 having a radius of 0.8 m. Either of the support materials (35, 36) has a ring shape with a width of 4 cm and a height of 3 cm, and the upper part of each support material is protected by a silicon rubber. The support material 35 is disposed on the position at 0.4 m from the center of the sieve net (the position at 0.5 relative to the radius 1 of the sieve net), and the support material 36 is disposed on the position at 0.56 m from the center of the sieve net (the position at 0.7 relative to the radius 1 of the sieve net), respectively. These support materials are fixed on the upper part of the punching metal below the sieve net, and a gap of 2 mm was provided between the sieve net and the support material in a state that the sieve net was not bended.

Example 14

Similar operations to those of Example 13 were conducted, except that the rocking-type circular sieving apparatus was changed to a rocking-type circular sieving apparatus formed of a sieve aperture diameter of 3,000 mm in the first classification step of the above-mentioned Example 13. When a continuous operation was conducted for one year and the metal sieve net was confirmed in a similar manner to that of Example 13, no damage (breakage) was observed on the sieve net.

Comparative Example 7

Similar operations to those of Example 13 were conducted, except that a support material was not disposed below the metal sieve net in the first classification step of the above-mentioned Example 13.

As a result, the sieve net was damaged at 3 months after the initiation of the operation. Therefore, the sieve net was replaced and the treatment amount was decreased by half, and the operation was restarted.

INDUSTRIAL APPLICABILITY

The method for producing a polyacrylic acid (salt)-based water absorbent resin according to the present invention can be applied to the production, especially the mass production of a water absorbent resin. Furthermore, the polyacrylic acid (salt)-based water absorbent resin obtained in the present invention is suitable for use as an absorbent body in hygiene products such as disposable diapers.

The present application is based on Japanese Patent Application No. 2012-171042 filed on Aug. 1, 2012, Japanese Patent Application Nos. 2012-171554 and 2012-171555 filed on Aug. 2, 2012, and the contents of the disclosures thereof are incorporated by reference herein in its entirety.

REFERENCE SIGNS LIST

10, 20 rocking-type sieve classification apparatus
121, 122, 123, 21, 22, 23, 30 sieve net
141, 143, 162, 163 ejection port
17 paper for trajectory recording
18 dedicated ballpoint pen
24 punching metal
25 tapping ball
26 support material
35, 36 support material
E eccentric gradient
R radial gradient

The invention claimed is:

1. A method for producing a polyacrylic acid (salt)-based water absorbent resin, which sequentially comprises:
    a polymerization step, in which a monomer aqueous solution containing acrylic acid (salt) as a main component is polymerized,
    a drying step, in which a water-containing gel-like cross-linked polymer obtained in the polymerization step is dried, and
    a classification step, in which a polymer obtained in the drying step is classified,
    wherein a rocking-type sieve classification apparatus is used in the classification step,
    the rocking-type sieve classification apparatus has a sieve net having a trajectory and a rotation speed in the following ranges:
    radial gradient R: from 5 to 40 mm,
    tangential gradient T: from 0.1 to 25 mm,
    eccentric gradient E: from 40 to 80 mm,
    rotation speed F: from 60 to 600 rpm; and two or more sieve nets each having an opening in the range of ±2% relative to an intended opening are used sequentially in the rocking-type sieve classification apparatus.

2. The production method according to claim 1, wherein the sieve net used in the rocking-type sieve classification apparatus has a diameter of 2 m or more and 10 m or less.

3. The production method according to claim 1, wherein the intended opening is from 600 to 1,000 μm.

4. The production method according to claim 1, wherein the intended opening is from 106 to 212 μm.

5. The production method according to claim 1, wherein one or more support materials are disposed on a position that is below the sieve net and inside of the frame of the sieve net in the rocking-type sieve classification apparatus the sieve net is a circular sieve, and at least one of the support materials is disposed, relative to the radius 1 of the sieve net, in the range of 0.20 to 0.60 from the center of the sieve net.

6. The production method according to claim 5, wherein there are two or more support materials each having a ring shape.

7. The production method according to claim 5, wherein a punching metal is disposed below the sieve net, each of the support materials is disposed on the upper part of the punching metal, and the sieve net is disposed above the support materials in the rocking-type sieve classification apparatus.

8. The production method according to claim 5, wherein at least one of the support materials is formed of a rubber or has a surface coated with a rubber.

9. The production method according to claim 6, wherein at least one of the support materials is disposed, relative to the radius 1 of the sieve net, in the range of from 0.61 to 0.85 from the center of the sieve net in the rocking-type sieve classification apparatus.

10. The production method according to claim 5, wherein the gap between the sieve net and the support materials is 0 mm or more and 5 mm or less in the rocking-type sieve classification apparatus.

11. The production method according to claim 7, wherein a tapping material is disposed between the sieve net and the punching metal.

12. The production method according to claim 1, which further comprises, before the drying step, a step of recycling a water absorbent resin fine powder that is formed after the classification step.

13. The production method according to claim 1, wherein the obtained polyacrylic acid (salt)-based water absorbent resin has a liquid permeability (SFC) of 20 ($\times 10^{-7}$·cm$^3$·s·g$^{-1}$) or more.

14. The production method according to claim 1, wherein continuous production over 30 days or more is conducted.

15. The production method according to claim 1, wherein the sieve net is washed at every predetermined period.

16. The production method according to claim 15, wherein the washing is conducted with warm water.

17. A method for producing a water absorbent resin, which comprises:

a polymerization step, in which an acrylic acid (salt) aqueous solution is polymerized to give a water-containing gel-like crosslinked polymer, a drying step, in which the water-containing gel-like crosslinked polymer is dried to give a water absorbent resin powder, a classification step, in which the water absorbent resin powder is classified, and a surface cross-linking step, in which the surface of the water absorbent resin powder is crosslinked, wherein a rocking-type sieve classification apparatus is used in the classification step that is conducted before and/or after the surface cross-linking step, two or more support materials are disposed on a position that is below the sieve net and inside of the frame of the sieve net in the rocking-type sieve classification apparatus, the support materials each have a ring shape and are disposed on the concentric circles of the sieve net.

18. The production method according to claim 17, wherein a punching metal is disposed below the sieve net, the support materials are disposed on the upper part of the punching metal, and the sieve net is disposed above the support materials in the rocking-type sieve classification apparatus.

19. The production method according to claim 17, wherein at least one of the support materials is formed of a rubber or has a surface coated with a rubber.

20. The production method according to claim 17, wherein the sieve net is a circular sieve, and at least one of the support materials is disposed, relative to the radius 1 of the sieve net, in the range of from 0.20 to 0.60 from the center of the sieve net in the rocking-type sieve classification apparatus.

21. The production method according to claim 20, wherein at least one of the support materials is disposed, relative to the radius 1 of the sieve net, in the range of from 0.61 to 0.85 from the center of the sieve net in the rocking-type sieve classification apparatus.

22. The production method according to claim 17, wherein the gap between the sieve net and the support materials is 0 mm or more and 5 mm or less in the rocking-type sieve classification apparatus.

23. The production method according to claim 17, wherein a tapping material is disposed between the sieve net and the punching metal.

24. The production method according to claim 17, which further comprises, before the drying step, a step of recycling a water absorbent resin fine powder that is formed after the classification step.

25. The production method according to claim 17, wherein the obtained polyacrylic acid (salt)-based water absorbent resin has an SFC of 20 ($\times 10^{-7}$·cm$^3$·s·g$^{-1}$) or more.

26. The production method according to claim 17, wherein the sieve net is washed at every predetermined period and the washing is conducted with warm water.

* * * * *